United States Patent
Skurnik et al.

[11] Patent Number: 5,948,105
[45] Date of Patent: Sep. 7, 1999

[54] METHOD FOR CONSERVING POWER BY ADJUSTING CLOCK FREQUENCY BASED ON A REPETITIVE TIMING CYCLE

[75] Inventors: David Skurnik, Kirkland; Patrick H Mawet, Snohomish; Nils Ingvar Andermo, Kirkland, all of Wash.

[73] Assignee: Mitutoyo Corporation, Kawasaki, Japan

[21] Appl. No.: 08/834,434

[22] Filed: Apr. 16, 1997

Related U.S. Application Data

[60] Provisional application No. 60/015,707, Apr. 17, 1996.

[51] Int. Cl.⁶ ...................................................... G06F 1/32
[52] U.S. Cl. .......................... 713/323; 713/330; 364/550; 364/556; 324/207.12
[58] Field of Search .......................... 395/750.01–750.08; 364/550, 556; 324/207.12; 713/300, 310, 320, 322, 323, 324, 330, 340

[56] References Cited

U.S. PATENT DOCUMENTS

| | | | |
|---|---|---|---|
| 4,974,164 | 11/1990 | Lewis et al. | 702/161 |
| 5,023,559 | 6/1991 | Andermo | 324/662 |
| 5,027,428 | 6/1991 | Ishiguro et al. | 324/662 |
| 5,305,452 | 4/1994 | Khan et al. | 395/551 |
| 5,317,385 | 5/1994 | Silva et al. | 356/356 |
| 5,378,935 | 1/1995 | Korhonen et al. | 327/114 |
| 5,440,501 | 8/1995 | Shimomura et al. | 702/150 |
| 5,481,697 | 1/1996 | Mathews et al. | 395/556 |
| 5,502,689 | 3/1996 | Peterson et al. | 368/156 |
| 5,664,201 | 9/1997 | Ikedea | 395/750.03 |
| 5,754,867 | 5/1998 | Walker | 395/559 |

*Primary Examiner*—Thomas C. Lee
*Assistant Examiner*—Harold Kim
*Attorney, Agent, or Firm*—Oliff & Berridge, PLC

[57] ABSTRACT

Power saving methods for a battery powered electronic measurement system includes controlling the clock speed for different subsystems of the electronic measurement system and controlling the timing cycles of a controller of the electronic measurement system. Controlling the clock speed of the different subsystems includes using a controller clock for the controller and an internal clock for a signal generating and processing circuit. The internal clock runs at a high frequency during a measurement operation. During other times, the internal clock is disabled. The controller clock outputs a first clock signal having a slow frequency which is substantially slower than the internal clock signal and a second clock signal having an extremely slow frequency which is substantially slower than the first clock signal. Controlling the timing cycles of the controller includes operating the controller using a fast mode timing cycle when measurements are being made, a slow mode timing cycle when measurements are not being made, and a sleep mode timing cycle when the controller is in a sleep mode. Each of the timing cycles includes a different length halt portion. During a halt portion, all data processing by the controller is stopped and the controller is run using the second clock signal. In a fast portion of the fast mode timing cycle, the controller is run using the first clock signal. In slow portions of the other mode timing cycles, the controller is run using the second clock signal.

24 Claims, 12 Drawing Sheets

METHOD FOR CONSERVING POWER BY ADJUSTING CLOCK FREQUENCY BASED ON A REPETITIVE TIMING CYCLE

BACKGROUND OF THE INVENTION

This non-provisional application claims the benefit of U.S. Provisional application Ser. No. 60/015,707, filed Apr. 17, 1996.

FIELD OF THE INVENTION

This invention relates to methods and apparatus for minimizing power consumption in electronic measurement systems. In particular, this invention is directed to methods and apparatus for minimizing the amount of time the electronic measurement system spends in a high power consumption mode.

DESCRIPTION OF RLEATED ART

Electronic measurement systems, such as those used in electronic calipers, electronic linear scales and the like, are well known in the art. Such electronic measurement systems are described in, for example, U.S. Pat. Nos. 4,420,754, 4,870,013, 4,879,508 and 5,023,559, and pending U.S. patent application Ser. No. 08/441,769, filed May 16, 1995. Such electronic measurement systems, unlike traditional mechanical measurement systems, such as mechanical calipers and the like, require electric power to be supplied to the electronic measurement system. When such electronic measurement systems are incorporated into hand-held calipers, or any type of measurement system which cannot be connected to power lines, electric power to the electronic measurement system is generally provided by batteries. However, such batteries are generally small and are generally only able to provide a limited amount of electric power.

Accordingly, those skilled in the art have recognized that such electronic measurement systems must be designed to minimize their power consumption. U.S. Pat. Nos. 4,586,260 and 4,974,164 describe conventional electronic measurement systems incorporating methods and apparatus for minimizing power consumption. For example, the '260 patent discloses an electronic measurement system having an electronic measurement system incorporating three different power modes. These three power modes are programmed into the electronic measurement system of the '260 patent to extend battery life. They are, in descending order of power consumption: 1) an awake mode; 2) an idle mode; and 3) an asleep mode.

In the awake mode, the display is active and indicates the mode of operation and the position value associated with that mode. The electronic measurement system is active and ready to take a measurement. The electronic measurement system will remain in the awake mode for fifteen minutes after the last activity has occurred. Such activities include taking a measurement, setting a zero limit, or setting the limit values or the readout units. The awake mode has the highest power consumption level.

In the idle mode the electronic measurement system has a moderate power consumption. The idle mode is entered when the electronic measurement system has not been used (e.g., no measurement has been taken) for fifteen minutes. When the electronic measurement system switches from the awake mode to the idle mode, the display is blanked. However, the electronic measurement system maintains the location of any previously set zero. The electronic measurement system switches from the idle mode to the awake mode when any button of the electronic measurement system is pressed, or when the slide of the electronic measurement system is moved.

After the electronic measurement system has been in the idle mode for thirty minutes, the electronic measurement system automatically switches to the asleep mode. In the asleep mode, the display remains blank and the electronic measurement system loses track of any previously set zero. The asleep mode has the lowest power consumption. The limit values and the readout units, such as inch or millimeter, are retained. The electronic measurement system switches from the asleep mode to the awake mode when any button of the electronic measurement system is pressed.

Similarly, the electronic measurement system of the '164 patent also switches from a high power consumption awake mode to a low power consumption standby mode when the electronic measurement system senses a predetermined period of inactivity, such as five minutes. In addition, the electronic measurement system of the '164 patent uses a high-power-consumption, electro-optic transducer. To minimize the power consumed by the high-power-consumption, electro-optic transducer, the '164 patent turns on the light source of the electro-optic transducer for only a small portion of each measurement cycle.

Furthermore, the electronic measurement system of the '164 patent controls the sample rate at which measurement samples are taken by the high-power-consumption, electro-optic transducer. In particular, when the measurements taken by the electro-optic transducer indicate that the position of the slide relative to the scale of the electro-optic transducer has not changed for predetermined number of measurement cycles, the sample rate is decreased by a predetermined percentage. The electronic measurement system continues decreasing the sampling rate when the relative position has not changed for additional one of the predetermined number of measurement cycles, until a predetermined minimum sampling rate is reached. At this minimum sampling rate, the light source of the electro-optic transducer is on for only approximately 1%–2% of each sampling cycle.

When the relative position of the slide and the scale of the electro-optic transducer changes at a normal rate, the current sample rate is increased by a predetermined percentage. The electronic measurement system increases the sampling rate whenever the relative position of the slide and the scale changes during one of the predetermined number of measurement cycles, until a predetermined maximum sampling rate is reached. At this predetermined maximum sampling rate, the light source of the electro-optic transducer is on for approximately 12% of each measurement cycle. Finally, whenever the relative position of the slide and the scale of the electro-optic transducer changes by more than the normal rate during one of the predetermined number of measurement cycles, the current sampling rate is doubled.

However, both of these prior art electronic measurement systems nonetheless suffer from an unacceptably low battery life.

SUMMARY OF THE INVENTION

The inventors of this invention have determined that the microprocessor 110 of the electronic measurement system of this invention consumes 20–25 times as much power as the rest of the electronic measurement system, including the electronic position transducer. This is especially true in view of the capacitive and inductive electronic position transducers used in the preferred embodiment of the electronic measurement system of this invention.

Accordingly, the '260 and '164 patents achieve some power savings. However, the electronic measurement systems disclosed in these references leave the microprocessor in a fully awake mode for relatively long stretches of time (15–30 minutes in the '260 patent and 5 minutes in the '164 patent). Thus, additional power savings can be achieved by properly controlling the operation of the electronic measurement system when the microprocessor is fully awake, beyond merely placing it into another controlled mode.

Accordingly, this invention provides an electronic measurement system that reduces a power consumption of the electronic measurement system when the microprocessor 110 is fully awake.

This invention further provides a method and apparatus for switching the microprocessor 110 between a fully awake mode and a semi-awake mode at a high frequency.

This invention also provides an electronic measurement system having a slow frequency clock for operating the microprocessor 110 and a high frequency burst clock for supplying clock signals to a signal generating and processing circuit during measurement cycles.

This invention further provides a high frequency burst clock generator for providing clock signals to the signal generating and processing circuit independently of the low frequency clock connected to the microprocessor 110.

In the electronic measurement system of this invention, the microprocessor 110 is formed using static CMOS technology. Accordingly, the amount of current consumed by the microprocessor 110 is directly proportional to the number of instructions performed by the microprocessor 110 per second. Thus, by reducing to as great an extent as possible the total number of instructions performed per measurement cycle, and the total number of measurement cycles per second, while maintaining an accurate position determination, the power consumption of the microprocessor 110 can be minimized even though it has not yet been placed into an idle mode, a standby mode, or an asleep mode.

In addition, the electronic measurement system of this invention has a microprocessor 110 and a separate signal generating and processing circuit. A first slow frequency clock is connected to the microprocessor 110. A second, high frequency burst clock is provided in the signal generating and processing circuit. The high frequency burst clock provides clock signals only to the signal generating and processing circuit, and only during measurement cycles. Thus, the signal generating and processing circuit is able to sample the output signal output from the transducer of the electronic measurement system at a high frequency while allowing the microprocessor 110 to be driven at a much lower frequency.

The burst generator of the electronic measurement system of this invention comprises a pair of current sources. Connected in parallel between the current sources are a Schmitt trigger, a capacitor, and a circuit path for switchably by-passing the Schmitt trigger and the capacitor. The output of the Schmitt trigger provides a 2 MHz square wave.

These and other features and advantages of this invention are described in, or apparent from, the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
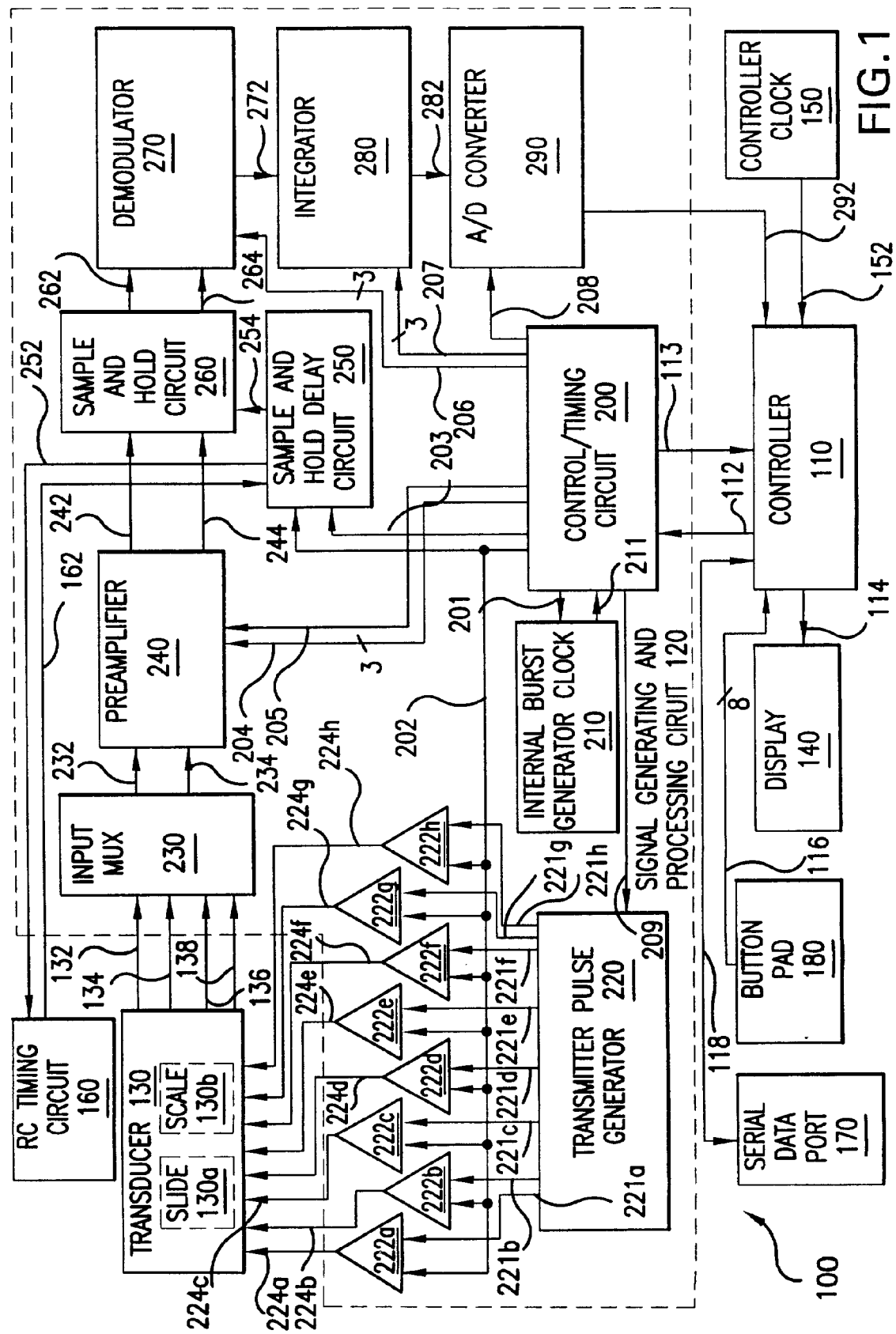
FIG. 1 shows one preferred embodiment of the electronic measurement system of this invention.

FIG. 1 shows one preferred embodiment of the electronic measurement system 100 of this invention. As shown in FIG. 1, the electronic measurement system 100 comprises a controller 110, a signal generating and processing circuit 120, a transducer 130, a display 140, a controller clock 150, an RC timing circuit 160, a serial data port 170, and a button pad 180.

The controller clock 150 outputs clock signal on a signal line 152 to the controller 110. The controller clock 150 is capable of outputting a plurality of clock signals, each clock signal having a different frequency. In particular, the controller clock 150 preferably outputs a slow clock signal using an 800 kHz oscillator and an extremely slow clock signal using a 32 kHz oscillator. In general, however, the frequency for the extremely slow clock signal is selected from the range of 10 kHz to 100 kHz. Similarly, the frequency for the slow clock signal is at least 500 kHz. The controller 110 is preferably of a commercially available variety which can control selection and activation of the desired clock rate, for example Sanyo LC5874. Accordingly there are clock control lines or switches (not shown) between the controller 110 and the controller clock components. Herein, the clock rate selection functions, and the associated circuits, are all described functionally as part of the controller clock 150.

The controller 110 outputs control signals on the signal lines 112 to the signal generating and processing circuit 120. The signal generating and processing circuit 120 generates, based on the control signals supplied by the controller 110, a plurality of drive signals to the transducer 130. The transducer 130 then outputs a plurality of position indicating signals back to the signal generating and processing circuit 120.

The signal generating and processing circuit 120 samples the signals output from the transducer 130 based on the RC timing circuit 160. The signal generating and processing circuit 120, based on the sampled position indicating signals output from the transducer 130, generates a digital position indicating signal. The digital indicating signal is output from the signal generating and processing circuit 120 on a signal line 292 to a controller 110.

The controller 110 then further processes the digital indicating signal and outputs a position signal on the signal line 114 to the display 140. The display 140 then displays the position indicated by the position signal to an operator.

The controller 110 is connected by a plurality of data input lines 116 to the button pad 180. The button pad 180 preferably includes eight buttons, including an "ON" button, an "OFF" button, a "ZERO SET" button, a "LIMIT SET" button, a "MM" button, an "INCH" button, a "MODE" button, and an "AUTO ON/OFF" button. An input/output data line 118 connects the controller 110 to the serial data port 170. The serial data port 170 allows the electronic measurement system 100 to be connected to an external control or storage device.

The controller 110 shown in FIG. 1 is preferably implemented using a programmed microprocessor 110 or microcontroller, and possibly one or more peripheral integrated circuit elements. The controller 110 can also be implemented on a programmed general purpose computer, a special purpose computer, an ASIC or other integrated circuit, a hard-wired electronic or logic circuit such as a discrete element circuit, a programmed logic device such as a PLD, a PLA, a FPGA, a PAL or the like. In general, any device which is capable of generating the control signals described herein can be used to implement the controller 110. Accordingly, the controller 110 will hereinafter also be referred to as the microprocessor 110.

The display 140 can be any standard CRT, LCD or LED visual display. The external control device can be a controller of a numerically controlled machine tool or the like, or a general purpose computer. In general, any device which could input the serial data position signal output on the output line 118 and further process or store it can be used as the external control or storage device.

As shown in FIG. 1, the signal generating and processing circuit 120 includes a control/timing circuit 200 which inputs the control signals output by the controller 110 on the signal line 112 and outputs control signals to the controller on the signal line 113. The control/timing circuit 200 processes the control signals received from the controller 110 and outputs control signals to the various elements of the signal generating and processing circuit 120.

In particular, an internal burst generator clock 210 receives a control signal from the control/timing circuit 200 on a signal line 201. When the internal burst generator clock 210 is activated, a high frequency clock signal is generated by the internal burst generator clock 210 and is output to the control/timing circuit 200 over a signal line 211. The frequency for the internal burst generator clock 210 is preferably low enough to operate the signal generating and processing circuit such that it allows sufficient signal rise time for the transducer 130. That is, the output of the transducer 130 should be allowed to rise to its peak value before each signal sample). However, except for this consideration, the frequency of the internal burst generator clock 210 is preferably high, and is at least 1 MHz, for example, and is more preferably 2 MHz.

The control/timing circuit 200 outputs pulse data on a signal line 209 to a transmitter pulse generator 220. The transmitter pulse generator 220 outputs driver signals on the signal lines 221a–221h based on the pulse data input over the signal line 209. Each of the signal lines 221a–221h are connected to one of a plurality transmitter drivers 222a–222h.

One scheme for providing pulses to the transducer 130 is described in co-pending U.S. patent application Ser. No. 08/634,095, filed Apr. 17, 1996, incorporated herein by reference. The pulsing scheme of the '095 application includes an overall signal processing architecture based on a closed-loop "follower" system. That is, each signal processing cycle can use the data from previous cycles to predict the expected present transducer position (the input position) and choose a pulse data input set coinciding with the expected present position. In this case, a digital output of the signal processing system can be compared the digital data representing the input position (the expected present position).

To save computations, and hence power, the same input digital data can be used as the basis for actual position data as follows. A bit-by-bit comparison of the output data with the input data is used to adjust bits of the input position data which deviate from the corresponding bits of the output data. For this invention, when there is no movement, or slow movement, which is a dominant condition of operation for many uses of the transducer, there will be no deviations.

For such a measurement cycle, all computations are avoided. The system is simply programmed to reuse existing data and instructions where appropriate. When there is significant movement, in practical uses of the transducer, typically only the least significant bits, i.e. the highest resolution bits, will show a deviation. In this case, it is still possible to restrict computations to changes associated with least significant bits, and thus avoid performing a complete set of position computations from scratch. This system of signal processing architecture is thus preferred as an additional means to minimize computations and thus conserve power in this invention, and is reflected in the signal processing description included herein.

Connected to each of the transmitter drivers 222a–222h is a signal line 202 from the control/timing circuit 200. The signal line 202 is also connected to a sample and hold delay circuit 250 of the signal generating and processing circuit 120. A synchronization signal output on the signal line 202 is used to control the transmitter drivers 222a–222h to provide proper modulation signals on the signal lines 224a–224h connected to the transducer 130.

While eight modulation signals are input to the transducer 130 over the signal lines 224a–224h, any number of signals can be generated and input to the transducer 130 by the signal generating and processing circuit 120. Similarly, there may be fewer or more transmitter drivers 222 than those shown in FIG. 1. For example, the transducer 130 may require sixteen different modulation signals, rather than eight.

In general, as described above, the transducer 130 will have a slide member 130a which is movable relative to a scale member 130b along a measurement axis. The signal lines 224 are connected to one or more capacitive or inductive transmitter electrodes formed on one of the slide member or the scale member. A capacitive or inductive transfer function between the slide member and the scale member of the transducer 130 modifies the signals input on the signal lines 224a–224h based on the relative or absolute position of the slide member relative to the scale member.

The transducer 130 shown in FIG. 1 is an absolute position transducer, where each scale of the transducer 130 is connected to one of a number of signal output lines 132–138. The signal output lines 132–138 are connected to the capacitive or inductive receiver electrodes of the slide member or the scale member of the transducer 130. Generally, all the input signal lines and the output signal lines will be connected to the same member of the transducer 130. It should also be appreciated that a relative position transducer may have fewer signal output lines.

The output signal lines 132–138 from the transmitter 130 are connected to an input multiplexer 230 of the signal generating processing circuit 120. The input multiplexer selectively connects two of the input signal lines 132–138 to the output signal lines 232 and 234 connected to the pre-amplifier of 240. The pre-amplifier 240, based on the control signals output from the control/timing circuit 200 on the signal lines 204 and 205, amplifies the signals output from the input multiplexer 230 on the signal lines 232 and 234. The pre-amplifier 240 then outputs these amplified signals on the signal lines 242 and 244 to the sample and hold circuit 260. U.S. patent application Ser. No. 08/634,097, filed Apr. 17, 1996, describes the pre-amplifier 240 in greater detail, and is incorporated herein by reference.

The sample and hold circuit 260 samples the amplified output signals output on the signal lines 242 and 244 based on a control signal output on the signal line 254 from the sample and hold delay circuit 250.

Based on the control signals output from the control/timing circuit 200 to the sample and hold delay circuit 250, the sample and hold delay circuit 250 outputs a control signal to the RC timing circuit 160 on the signal line 252. The RC timing circuit 160 outputs a delayed control signal corresponding to the control signal output on the signal line 252 back to the sample and hold delay circuit 250 on the signal line 162.

The sample and hold delay circuit 250 outputs the control signal on the signal line 254 based on the synchronization signal output on the signal line 202 from the control/timing circuit and the delayed control signal output on the signal line 162 from the RC timing circuit. The sample and hold delay circuit 250 further generates the control signal on the signal line 254 based on a second control signal output from the control/timing circuit 200 on the signal line 203. U.S. patent application Ser. No. 08/634,094, filed Apr. 17, 1996, describes the operation of these circuit elements in greater detail, and is incorporated herein by reference.

Once the sample and hold circuit 260 has sampled the amplified output signals input on the signal lines 242 and 244 from the pre-amplifier 240, the held signals are output on the signal lines 262 and 264 to a demodulator 270. The control/timing circuit 200 also outputs a plurality of control signals on the signal lines 206 to the demodulator 270. The demodulator 270 demodulates the signals received from the sample and hold circuit 260 and outputs a demodulated signal on the signal line 272 to the integrator 280.

The integrator 280, based on a plurality of control signals output on the control lines 207 from the control/timing circuit 200, integrates a number of the demodulated signals output from the demodulator 270 on the signal line 272. The integrator 280 then outputs the integrated signal on the signal line 282 to an analog-to-digital (A/D) converter 290. Based on a control signal output from the control/timing circuit 200 on the signal line 208, the A/D converter 290 converts the integrated signal received from the integrator 280 on the signal line 282 to a digital signal. This digital signal is then output on the signal line 292 to the controller 110.

Figure 2:
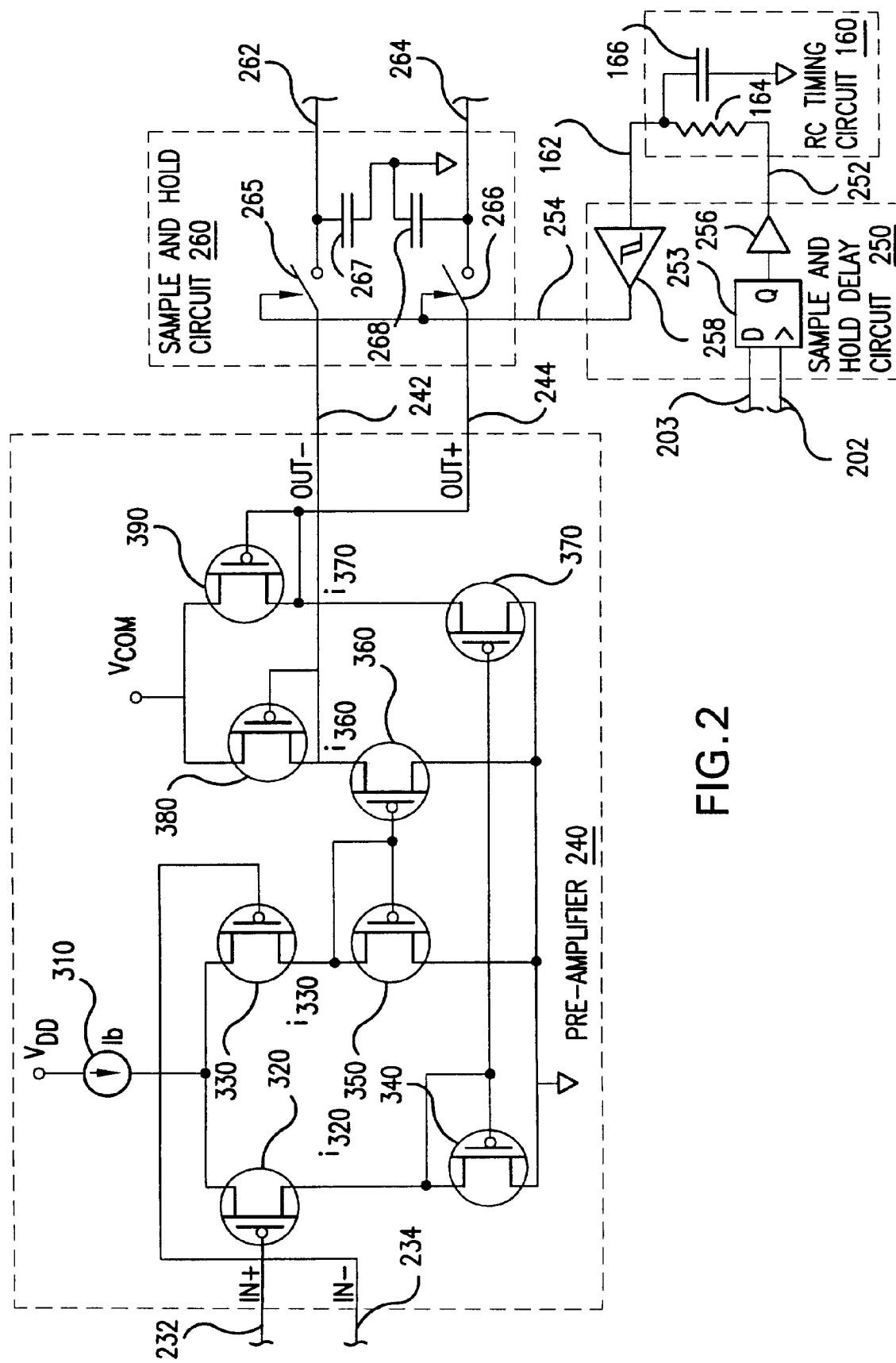
FIG. 2 shows the pre-amplifier, the sample and hold delay circuit, the RC timing circuit, and the sample and hold circuit of FIG. 1 in greater detail.

FIG. 2 shows in greater detail the pre-amplifier 240, the sample and hold delay circuit 250, the RC timing circuit 160 and the sample and hold circuit 260. In particular, as shown in FIG. 2, the pre-amplifier 240 is a folded, differential common source amplifier. While one stage of such an amplifier is shown in FIG. 2, any number of stages could be used, as shown in the incorporated '097 application. As shown in FIG. 2, the signal line 232 is connected through the IN+ terminal of the pre-amplifier 240 to a gate of a first PMOS transistor 320. The other signal line 234 is connected through the IN– terminal to a gate of a second PMOS transistor 330. The sources of the first and second PMOS transistors 320 and 330 are connected to a common current source 310. The common current source 310 outputs a current $I_b$.

A drain of the first PMOS transistor 320 is connected to both a gate and a drain of a first NMOS transistor 340. Similarly, a drain of the second PMOS transistor 330 is connected to both a gate and a source of a second NMOS transistor 350. The gate of the second NMOS transistor 350 is also connected to a gate of a third NMOS transistor 360, while the gate of the first NMOS transistor 340 is also connected to a gate of a fourth NMOS transistor 370. A source of the fourth NMOS transistor 370 is connected to the signal line 244 through an OUT+ terminal of the pre-amplifier 240. A source of the third NMOS transistor 360 is similarly connected to the output signal line 242 through an OUT– terminal of the pre-amplifier 240. The drains of the first-fourth NMOS transistors 340–370 are connected to ground.

The source of the third NMOS transistor 360 is also connected to a gate and a drain of a third PMOS transistor 380. Similarly, the source of a fourth NMOS transistor 370 is also connected to a gate and a drain of a fourth PMOS transistor 390. The sources of the third PMOS transistor 380 and the fourth PMOS transistor 390 are connected to a common voltage $V_{COM}$.

Thus, the first and second PMOS transistors 320 and 330 form a differential common source amplifier. The first-fourth NMOS transistors 340–370 form a current mirror. The third and fourth PMOS transistors 380 and 390 form a load having the same transistor type as the differential common source amplifier formed by the first and second PMOS transistors 320 and 330.

The first and second PMOS transistors 320 and 330 forming the input of the pre-amplifier 240 are a classic PMOS differential pair. The output currents $I_{320}$ and $I_{330}$ of the transistors 320 and 330 are mirrored by the first-fourth NMOS transistors 340–370. Thus, the current of the differential input stage formed by the transistors 320 and 330 is:

$$I_{330} - I_{320} = G_{320} * (V_{IN+} - V_{IN-})$$

where $G_{320}$ is the transconductance of both the first PMOS transistor 320 and the second PMOS transistor 330. As described above, because the first and second PMOS transistors 320 and 330 are both P-type transistors, their transconductances are generally the same. This is because, although the transconductance is very dependent upon uncontrollable manufacturing process variables, the transistors 320 and 330 are both PMOS transistors, and therefore will be form during the same manufacturing processes. In particular, the uncontrollable manufacturing processes which affect the transconductance parameter $K'_P$ of the PMOS transistors 320 and 330, while uncontrollable, will be the same for both transistors.

That is, because the PMOS transistors 320 and 330 undergo the same manufacturing steps, the transconductance parameter $K'_P$ for each of the PMOS transistors 320 and 330 is affected to the same degree. Thus, the transconductance parameters of the PMOS transistors 320 and 330 are closely matched and their transconductances g are therefore generally the same. For the same reasons, the transconductances g of the first and second NMOS transistors 340 and 350 are generally the same. Likewise, the transconductances g of the third and fourth NMOS transistors 360 and 370 are generally the same. Finally, for the same reasons, the transconductances g of the third and fourth PMOS transistors 380 and 390 are generally the same.

In addition, the ratios of the transconductances of the first-fourth NMOS transistors 340–370 of the current mirror are selected to increase the gain of the circuit. In particular, the transconductances of the third and fourth NMOS transistors 360 and 370 are multiples of the transconductances of the second and first NMOS transistors 350 and 340, respectively. Preferably, the same multiple k is used for the transistor 360 and 370. Thus:

$$I_{360} = k*I_{330}, \text{ and } I_{370} = k*I_{320}$$

The output PMOS transistors 380 and 390 of the load section are dial connected, so that the differential output is:

$$V_{OUT+} - V_{OUT-} = (I_{360} - I_{370})/g_{380}$$

where $G_{380}$ is the transconductance of the third PMOS transistor 380 and the fourth PMOS transistor 390. Accordingly, the voltage gain $A_V$ of the pre-amplifier 240 is:

$$A_V = (V_{OUT+} - V_{OUT-}) / (V_{IN+} - V_{IN-})$$
$$= k*(g_{320} / g_{380})$$

Furthermore, the transconductance g of a PMOS transistor having a width w and a length l and biased at a current I is:

$$g = (2*K'_P*I*(w/l))^{1/2}$$

where $K'_P$ is the manufacturing process-dependent transconductance parameter for the PMOS transistors 320, 330, 380 and 390. Finally, the bias currents in the pre-amplifier 240 for the first and second PMOS transistors 320 and 330 are $I_B/2$. The bias currents in the pre-amplifier 240 for the third and fourth PMOS transistors 380 and 390, supplied through the common voltage terminal, are $k*I_B/2$. Thus, the gain $A_V$ for the pre-amplifier 240 is:

$$A_V = k*[(2*K'_P*I_B(w_{320}/l_{320}))/(2*K'_P*k*(I_B/2)*(w_{380}/l_{380}))]^{1/2}$$
$$= [(2*k*(w_{320}/l_{320}))/(w_{380}/l_{380})]^{1/2}$$

Thus, the gain $A_V$ of the pre-amplifier 240 is independent of the transconductance parameter $K'_P$, which is highly depended upon the uncontrollable variable manufacturing process parameters which occur during manufacturing of the PMOS transistors 320, 330, 380 and 390. It should also be appreciated that the first and second PMOS transistors 320 and 330 can be formed of multiple transistors that can be switched in and out of the circuit forming the preamplifier 240 to create various gain settings.

The sample and hold delay circuit 250 comprises a D-type flip-flop 253, a driver 256, and a Schmitt trigger 258. The D input of the D-type flip-flop 253 is connected to the control signal line 203 from the control/timing circuit 200. The clock input for the D-type flip-flop 253 is connected to the signal line 202, which inputs the synchronization signal from the control/timing circuit 200. The driver 256 is connected between the Q output of the D-type flip-flop 253 and the signal line 252. The input of the Schmitt trigger 258 is connected to the input signal line 162, while the output of the Schmitt trigger 258 is connected to the signal line 254.

The RC timing circuit 160 comprises a resistor 164 and a capacitor 166. The resistor 164 is connected between the input signal line 252 from the driver 256 and the output signal line 162, which is connected to the Schmitt trigger 258. The capacitor 166 is connected between the output signal line 162 and ground. Thus, when an output signal is output from the driver 256 on the signal line 252 to the RC timing circuit 160, the signal on the output signal line 162 from the RC timing circuit will rise as the decaying exponential based on the resistance of the resistor 164 and the capacitance of the capacitor 166. In particular, the resistance of the resistor 164 and the capacitance of the capacitor 166 will be selected such that the delay generated by the RC timing circuit 160 is within a predetermined interval of the time when the drive signals are input to the transducer 130 from the drivers.

The output from the Schmitt trigger 258 on the signal line 254 is used as a control signal by the sample and hold circuit 260. In particular, the signal line 254 is connected to switches 265 and 266 of the sample and hold circuit 260. One pole of the switch 265 of the sample and hold circuit 260 is connected to the input line 242. The other pole of the switch 265 is connected to the output line 262. Similarly, one pole of the switch 266 is connected to the input signal line 244, while the other pole of the switch 266 is connected to the output signal line 264. A first capacitor 267 is connected between the output signal line 262 and ground, while a second capacitor 268 is connected between the signal line 264 and ground.

When the switches 265 and 266 of the sample and hold circuit 260 are closed, the input signals received on the input signal lines 242 and 244 are passed through the switches 265 and 266 to the output lines 262 and 264. Simultaneously, the capacitors 267 and 268 are charged. Then, when the switches 265 and 266 are opened, the voltage amplitudes on the signal lines 264 and 266 are held to the voltages stored on the capacitors 267 and 268, respectively. Then the voltages held by the capacitors 267 and 268 are input and demodulated by the demodulator 270.

Figure 3:
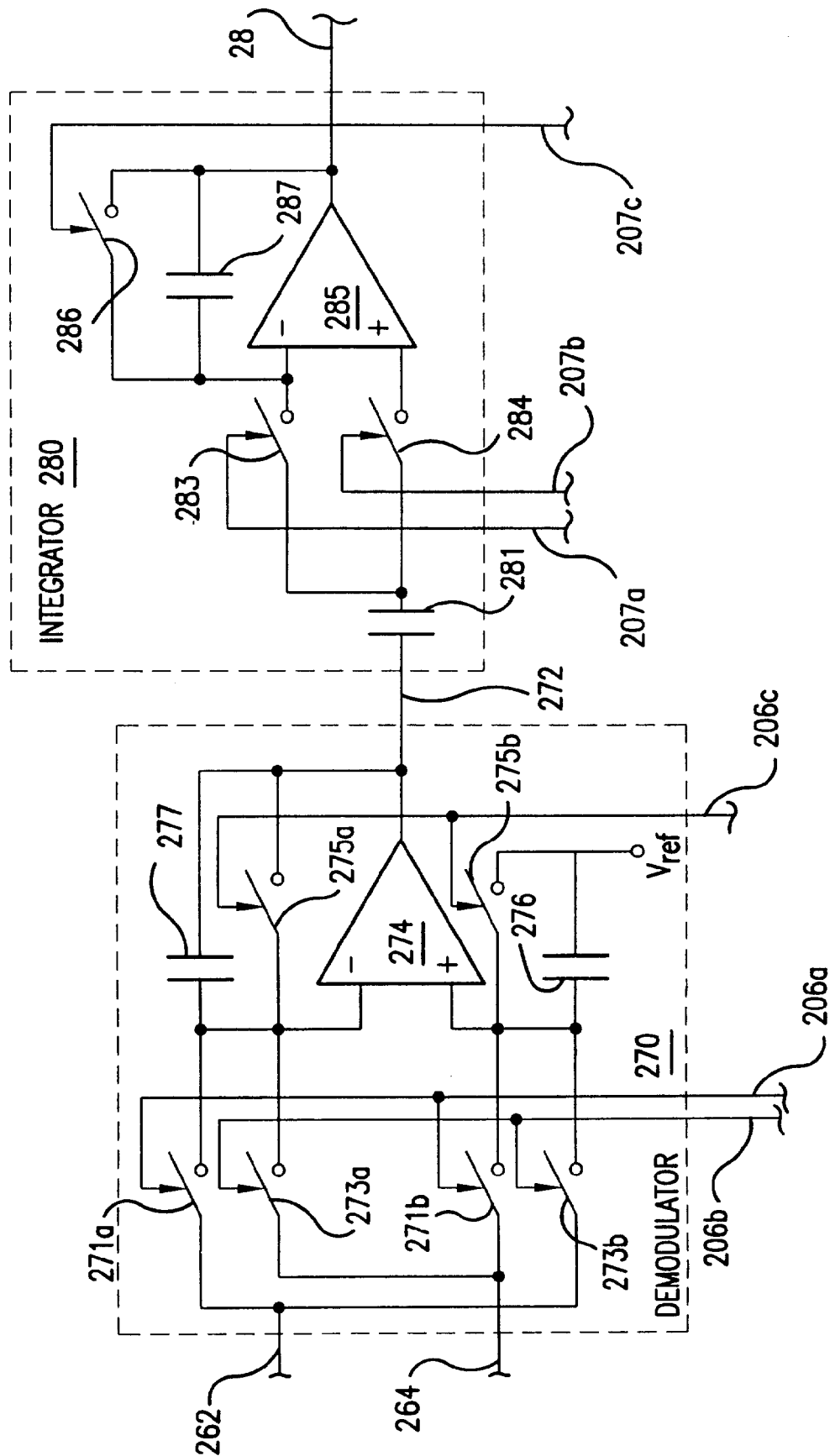
FIG. 3 shows the demodulator and the integrator of FIG. 1 in greater detail.

FIG. 3 shows the demodulator 270 and the integrator 280 in greater detail. As shown in FIG. 3, the demodulator 270 comprises two sets of switches 271a and 271b, and 273a and 273b, respectively. The input signal line 262 is connected to one pole of each of the switches 271a and 273b. The input signal line 264 is similarly connected to one pole of each of the switches 273a and 271b. A first control signal line 206a from the control/timing circuit 200 is used to control the switches 271a and 271b. A second control signal line 206b from the control/timing circuit 200 is used to control the switches 273a and 273b.

The other poles of each of the switches 271a and 273a are connected to the inverting input of an operational amplifier 274. Similarly, each of the other poles of the switches 271b and 273b are connected to the non-inverting input of the operational amplifier 274. The inverting input of the operational amplifier 274 is connected to the output signal line 272 of the operational amplifier 274 by a capacitor 277 and a switch 275a connected in parallel. Similarly, the non-inverting input of the operational amplifier 274 is connected to a reference voltage $V_{ref}$ by a capacitor 276 and a switch 275b connected in parallel. A third control signal line 206c from the control/timing circuit 200 is used to control the switches 275a and 275b.

The demodulated signal output from the operational amplifier 274 of the demodulator 270 on the signal line 272 is input to a capacitor 281 of the integrator 280. The capacitor 281 is connected to the inverting and non-inverting inputs of an operational amplifier 285 through a first switch 283 and a second switch 284, respectively. The first switch 283 is controlled by a control signal output from the control/timing circuit 200 on a first signal line 207a. The second switch 284 is similarly controlled by a second control signal output from the control/timing circuit 200 on a second control signal line 207b.

The output signal line 282 of the integrator 280 is connected to the output of the operational amplifier 285. The output of the operational amplifier 285 is fed back to the inverting input of the operational amplifier 285 through a capacitor 287 and a switch 286 which are connected in parallel. A control signal for the switch 286 is input from the control/timing circuit 200 over a third control signal line 207c.

Figure 4:
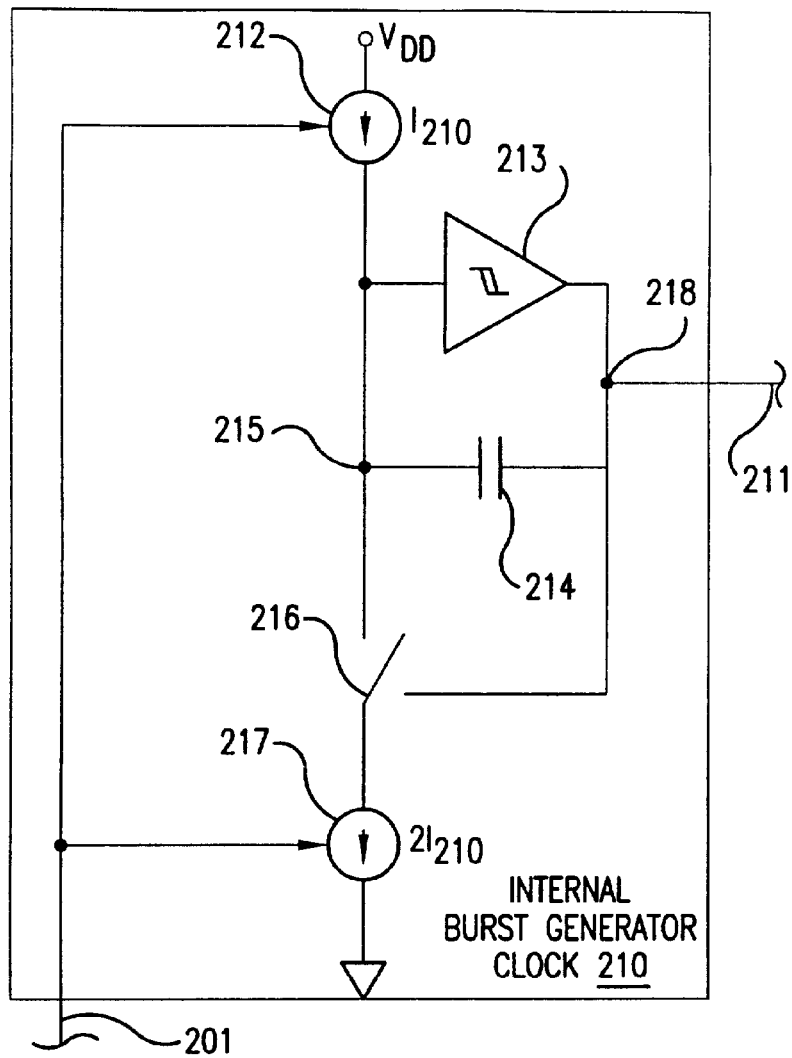
FIG. 4 shows the burst generator of FIG. 1 in greater detail.

FIG. 4 shows in greater detail the internal burst generator clock 210. As shown in FIG. 4, the internal burst generator clock 210 includes a first current source 212 connected to the voltage source $V_{DD}$. The first current source 212 outputs a current $I_{210}$. The first current source 212 is enabled by a low signal output from the control/timing circuit 200 over the control line 201. When enabled, the first current source 212 outputs the $I_{210}$.

The output of the first current source 212 is connected in parallel between the input of a Schmitt trigger 213, a capacitor 214, and the first pole of a switch 216. The first pole of the switch 216 is connected to a node 215 between the input of the capacitor 214 and the output of the first current source 212 downstream of the input to the Schmitt trigger 213. The output of the Schmitt trigger 213 and the output of the capacitor 214 are connected together and to the output signal line 211 at a node 218. A second pole of the switch 216 is also connected to the output of the capacitor 214 and the Schmitt trigger 213.

A third pole of the switch 216 is connected to the input of a second current source 217. The output of the current source 217 is connected to ground. The current source outputs a current I that is twice as large as the current $I_{210}$ output by the first current source 212. The current source 217, like the current source 212, is enabled by a low signal input through the signal line 201 from the control/timing circuit 200. The switch 216 selectively connects the first pole and the second pole of the switch 216 to the third pole of the switch 216.

Figure 5:
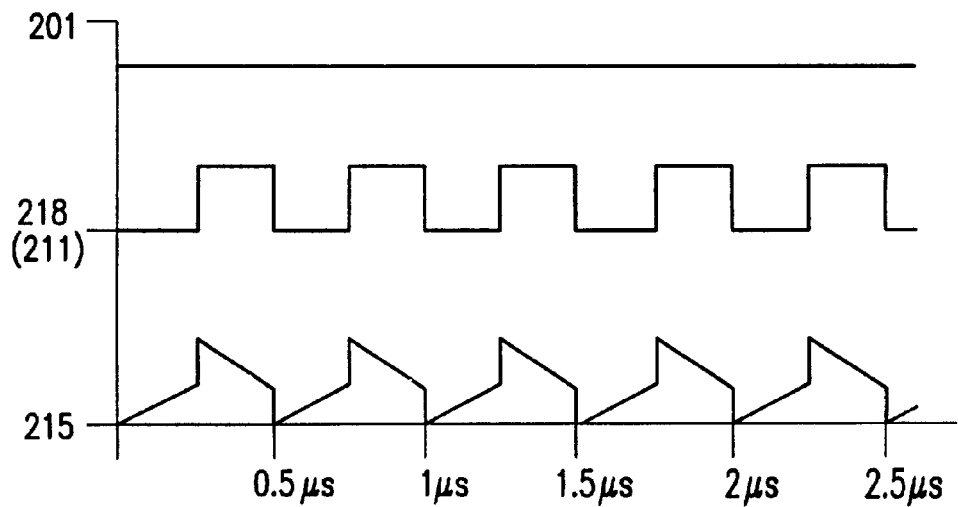
FIG. 5 shows the input and output signals to and from the burst generator shown in FIG. 4.

FIG. 5 shows the waveforms present at the node 215 and at the node 218 (and thus on the output line 211) when the enable signal on the signal line 201 goes low. As shown in FIG. 5, when the enable signal on the signal line 201 is high, the voltage at the node 215 and on the output signal line 211 is at a low voltage. When the enable signal on the signal line 201 goes low at time $t_0$, the waveform at the node 215 is a generally saw-tooth shaped waveform. The waveform on the output line 211 is a 50% duty cycle square wave. Both the waveforms at the node 215 and on the output line 211 have a frequency of approximately 2 MHz (and thus a period of approximately 0.5 μs. The control/timing circuit 200 sets the enable signal on the output line 201 to low about 5.5 microseconds after the transducer is activated to provide adequate time for the bias circuit to settle.

The incorporated references separately describe desirable low-power means to provide input signals and derive accurate output signals from the transducer 130. Thus, the primary power savings achieved by this invention are gained by operating the microprocessor as outlined below with respect to FIGS. 6–10. However, it should also be appreciated that substantial power savings are also achieved in the signal generating and processing circuit 120. In particular, the signal generating and processing circuit 120 operates in three different modes: 1) a shut down mode; 2) a standby mode; and 3) a sampling mode.

In the shut down mode, all of the functions of the signal generating and processing circuit 120 are disabled. That is, all of the functional circuits of the signal generating and processing circuit 120 are turned off. This includes a bias current generating circuit (not shown) and a reference voltage generating circuit (not shown). In the shut down mode, the signal generating and processing circuit 120 consumes essentially zero current. The signal generating and processing circuit 120 is generally put into the shut down mode only when the microprocessor 110 is put into the sleep mode, as described below.

In the standby mode, the bias current generating circuit and the reference voltage generating circuit are enabled, so that the bias current and the reference voltage are available to the various blocks of circuits of the signal generating and processing circuit 120 are ready to be activated. These blocks of circuits include a front end block comprising the multiplexer 230, the pre-amplifier 240, the sample and hold delay circuit 250, the sample and hold circuit 260, the demodulator 270 and the integrator 280, a converter block comprising the A/D converter 290, and a battery check block comprising a battery check circuit (not shown).

In general, once the bias current generating circuit and the reference voltage generating circuit are enabled, the bias current generating circuit and the reference voltage generating circuit take about 1 ms to become fully activated. When the bias current generating circuit and the reference voltage generating circuit are enabled, they draw at most 5 μA of current.

When the bias current generating circuit and the reference voltage generating circuit are enabled, the signal generating and processing circuit 120 is ready to be put into the sampling mode. In the sampling mode, each of the various circuits blocks are separately enabled. In this manner, each of the various circuit blocks can be enable independently of each other. Thus, each block can be enabled for just as long as it takes that block to receive the signals input to it, process the input signals, and output the processed signals to the next block or some other portion of the signal generating and processing circuit 120. Because each circuit block is enable only as long as it needs to be, the overall power consumption by the signal generating and processing circuit 120 is minimized.

It should also be appreciated that while each measurement cycle takes only about 30 μs, the actual time each of the blocks is actually enabled is only a fraction of this time. Thus, the signal generating and processing circuit 120 does not need to be in the sampling mode for very long, and thus consumes little power on a time-averaged basis. This short sampling time also makes it possible to shut down the bias current and reference voltage supplies to the various circuit blocks between measurement events, rather than shutting them down only when the signal generating and processing circuit 120 is place into the shut down mode.

Figure 6:
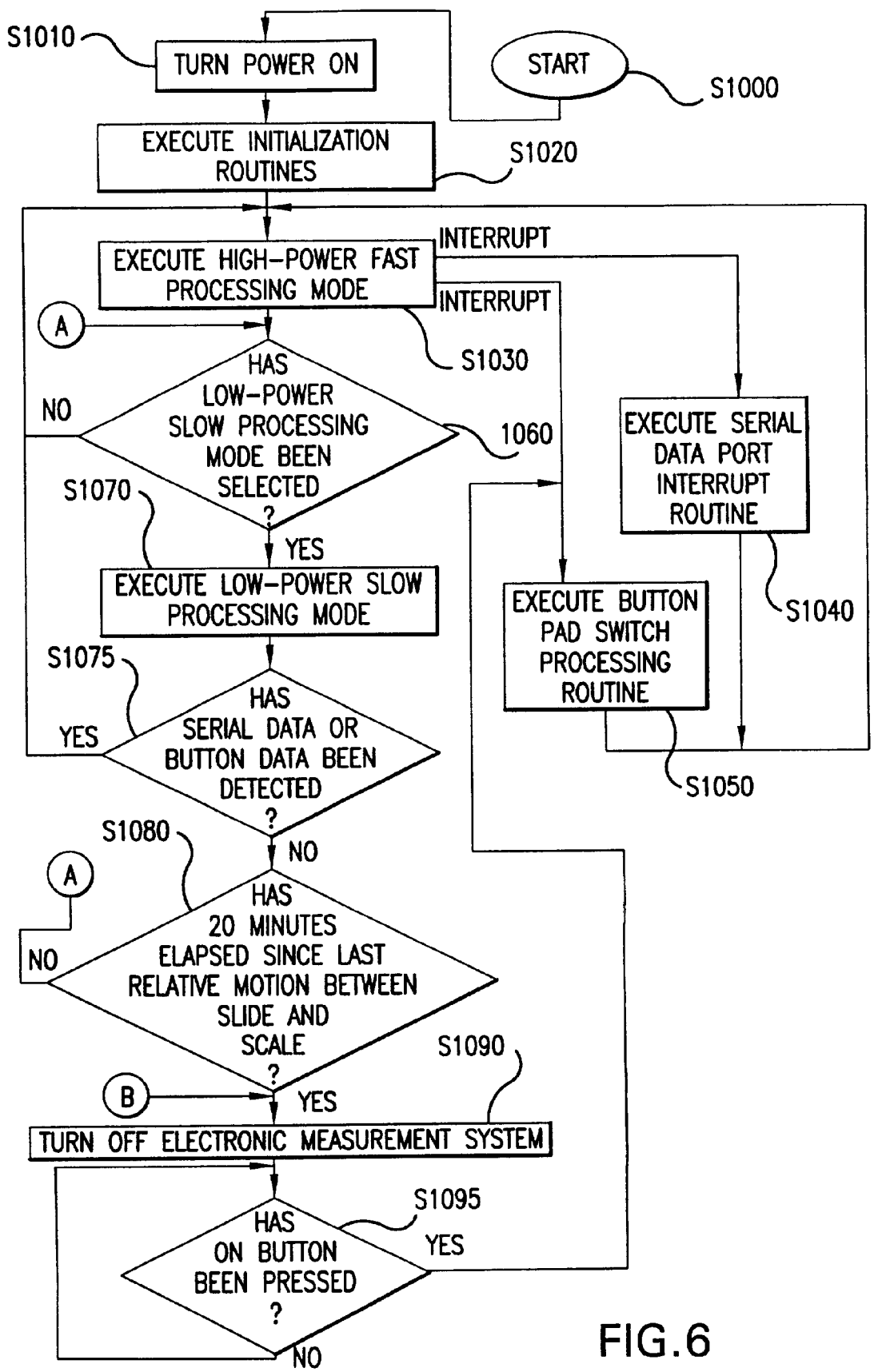
FIG. 6 is a flowchart outlining the general operation of the preferred embodiment of the electronic measurement system shown in FIG. 1.

FIG. 6 is a flowchart outlining the control program running on the microprocessor 110 for operating the electronic measurement system 100. As shown in FIG. 6, when the control program is started in step S1000, the power is turned on in step S1010. Once the power is turned on in step S1010, control continues to step S1020, where the initialization routines for initializing and setting up the microprocessor 110 and the control/timing circuit 200 of the electronic measurement system 100 are performed. Control then continues to step S1030.

In step S1030, the microprocessor 110 is operated in a high-power fast processing mode, subject to the interrupts shown. In the high-power fast processing mode, the microprocessor 110 performs all measurements and runs through all status check routines, as shown in greater detail in FIG. 7.

When the microprocessor 110 is operating in the high-power fast processing mode, the microprocessor 110 can be interrupted in two ways. First, a serial data port interrupt can be generated by the serial data port 170 in response to a data request by the external device connected to the serial data port 170. When the serial data port interrupt is generated, control jumps from the high-power fast processing mode of step S1030 to step S1040. In step S1040, the current position data is output as serial data through the serial data port 170 to the external device. Control then jumps back from step S1040 to step S1030. Similarly, when the control program is in step S1030 and one of the buttons 180 are pushed, control jumps from step S1030 to step S1050. In step S1050, the control program performs the appropriate switch processing for the button that was pushed. Control then jumps back to step S1030. Once all the embedded processing in step S1030 is performed, control continues to step S1060.

That is, when the microprocessor 110 is in step S1030 and the microprocessor 110 detects that motion has stopped, which is a condition for the low-power slow processing mode to be selected, control continues from step S1030 to step S1060. In step S1060, the control system determines whether low-power slow processing mode has been selected. If no relative motion has occurred and low-power slow processing mode has been selected, control continues to step S1070. Otherwise, if selection of the low-power slow processing mode is not possible, due to motion between the slide and the scale of the transducer 130, control returns to step S1030.

In step S1070, the control system enters the low-power slow processing mode. Next, in step S1075, the control system determines if step S1070 has terminated due to a button being pressed. If so, control jumps back to step S1030. Otherwise, control jumps to step S1080.

In step S1080, the control system determines if the elapsed time since the last detected relative motion between the slide and the scale of the transducer 130 is at least twenty minutes. If twenty minutes since relative motion last occurred has not elapsed, control jumps back to step S1060. Otherwise, if the elapsed time is at least twenty minutes, control continues to step S1090. In step S1090, the microprocessor 110 is placed into a mode which is effectively "off", except for the ability to respond to the ON button. Control then continues to step S1095. In step S1095, the control system determines if the ON button has been pushed. If the ON button has not been pushed in step S1095, control jumps back to step S1095. Otherwise, control jumps back to step S1050.

Figure 7:
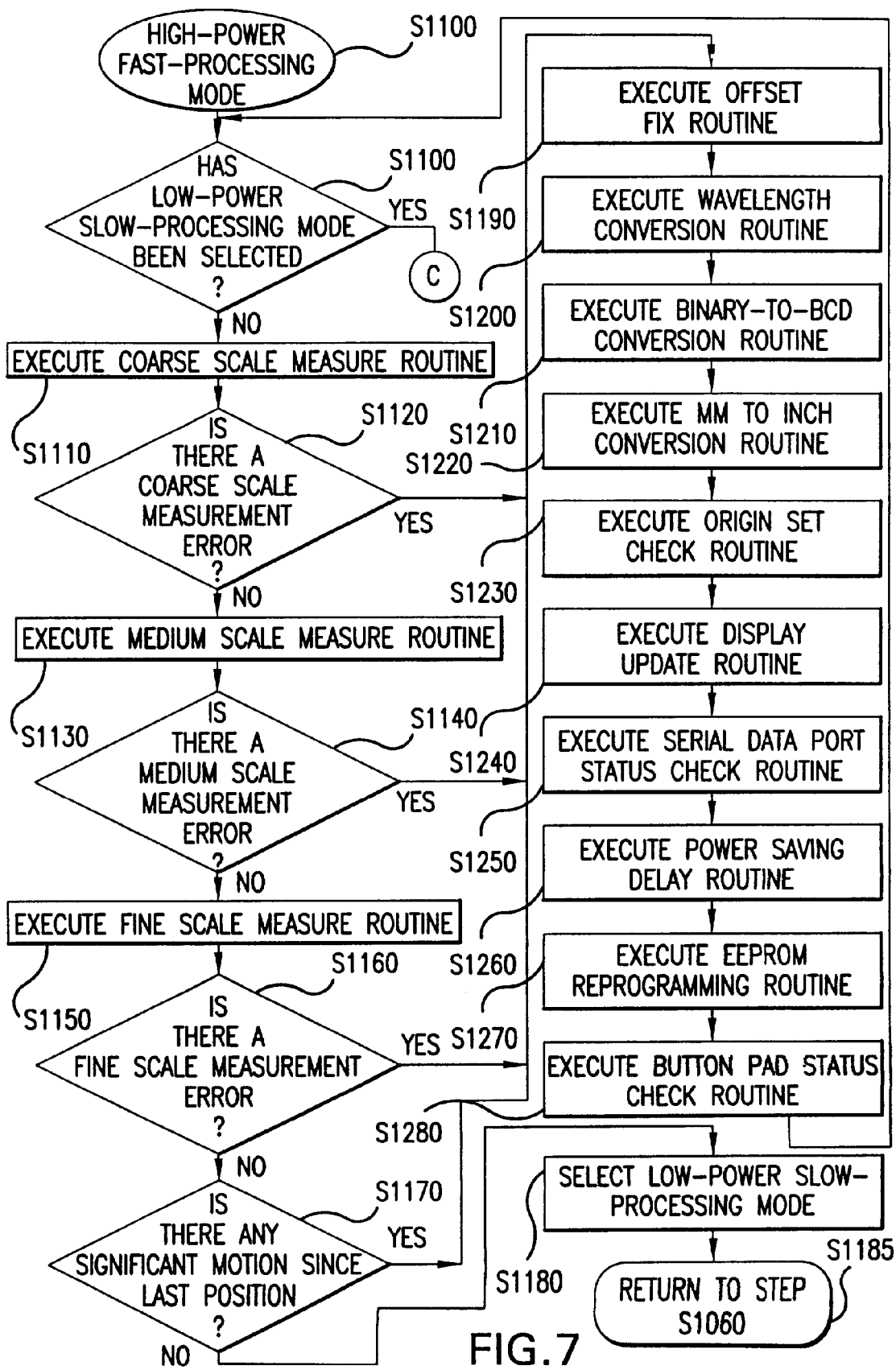
FIG. 7 shows the high-power fast processing mode of FIG. 6 in greater detail.

FIG. 7 shows the high-power fast processing mode of step S1030 in greater detail. FIG. 7 shows the preferred embodiment which includes a 3-scale absolute-type transducer and a follower-type signal processing architecture. The follower-type signal processing architecture creates a transducer input that corresponds to the expected position, and that produces a "null" output if the transducer is actually at that position. Any deviation from a null output can be used to correct the digital inputs data to represent the actual position, if a deviation is identified. This is useful for computational efficiency, and for the related power saving. The incorporated references include further useful details for such a system.

In the high-power fast processing mode, the absolute position electronic measurement system 100 of this invention attempts to converge as fast as possible to the correct absolute position. If the methods and apparatus of the electronic measurement system of this invention are used with an incremental-type position encoder, then steps S1110–S1140 are eliminated, control jumps directly from step S1100 to step S1150. The electronic measurement system keeps track of accumulated motion by methods well-known to those skilled in the art, and attempts to measure as quickly as possible the correct relative position between the slide and the scale.

Each time a measurement sample indicates that the transducer has moved, the display 140 is updated with a new calculated absolute or relative position. Otherwise, the last position is still valid and no update is performed because updating the display is a very time-consuming and a very power-consuming procedure. This is due to the large number of data conversions required, such as wavelength conversion, binary data to binary coded decimal data, and millimeters to inches, as outlined below. The microprocessor 110 continues cycling through the high-power fast processing mode of step S1030 until the relative motion between the slide and the scale has stopped.

As shown in FIG. 7, when the high-power fast processing mode of step S1030 is entered, control jumps to step S1100. In step S1100, the control system determines if the low-power slow processing mode has been selected. If so, control jumps to step S1070. Otherwise control continues to step S1110. In step S1110, a coarse scale measurement is taken. This measurement may be just a "raw" value from the A/D converter 290. Next, in step S1120, the control system determines if the A/D value is "null". That is, the control system determines if the A/D value corresponds to the expected position.

If it does not, this is considered an "error". An error will generally be present only during motion. For low-power measuring tools, an accurate position is generally not required during motion. Therefore, for the preferred embodiment shown, whenever an "error" is detected, the display is updated with an approximate position based on whichever scale resolution measuring mode displays an error. Thus, the display roughly corresponds to the motion, and computation is minimized. If there is an error, control jumps to step S1190.

If, in step S1120, the control system determines the electronic measurement system shows no error in the coarse position measurement mode, control continues to step S1130. In step S1130, a medium scale measurement is performed. Next, in step S1140, the control system again determines if the A/D value is "null". If it is not null, control then again jumps to step S1190.

If, in step S1140, the control system determines that there is no error, control continues to step S1150. In step S1150, a fine scale measurement is performed. Next, in step S1160, the control system once again determines if the A/D value is "null". If it is not null, control again jumps to step S1190. However, in step S1160, if the control system determines that there is no error, the control continues to step S1170.

Arriving at step S1170 implies that all A/D value measurements exhibit no significant error. If this is the case, it is likely that motion is completely or nearly stopped. The control system compares a previous set of A/D values corresponding to a previous position measurement cycle with the A/D values of the present measurement. If they are not identical, then there has been motion since the last position update, and control jumps to step S1190. If the A/D values are identical, then there has been no motion since the last position measurement. Thus, the display does not need to be updated. Control then continues to step S1180, where the low-power slow processing mode is selected. Control then jumps back to step S1060 in step S1185.

In step S1190, the absolute position register is offset according to transducer design characteristics and the result is stored for following computations. Next, in step S1200, wavelength conversion, if required, is performed to convert the absolute position register values (often representing fractions of a spatial wavelength) to an actual position or distance value, using the different known wavelengths for each of the coarse, medium and fine scales of the absolute position transducer 130. Control then continues step S1210.

In step S1210, the five decimal digits in the display are calculated from the 16-bit binary data. That is, a binary to binary-coded-decimal (BCD) conversion is performed. Next, in step S1220, if the inch mode for the display has been selected, the position determination (which is in millimeters) is converted to inches. Control then continues to step S1230. In step S1230, the origin set check routine is performed. In this routine, the control system determines if the user has pressed the origin key for at least one second. If so, the origin set check routine is called and the origin is reset to the current position of the slide on the scale of the transducer 130.

Next, in step S1240, the LCD display 140 is updated with the latest position data. The display enunciators, such as "MM", "INCH", "B" (low battery), "H", and "INC" (incremental measurement) are also updated on the LCD display 140. Control then continues to step S1250. In step S1250, the status of the serial data port is checked. If the serial data port indicates an external device has requested serial data, control jumps to step S1040. Whether control returns from step S1040 after processing the interrupt or the control system leaves step S1250 normally, control continues to step S1260.

In step S1260, the control system inserts a power saving delay into the high-power fast processing mode. In step S1260, as shown in greater detail in FIG. 8, the control system further determines if control should jump to the low-power slow processing mode of step S1070 under a special condition corresponding insignificant motion. If jumping to the low-power slow processing mode of step S1070 is not appropriate, control continues to step S1270 after the power saving delay.

In step S1270, the control system executes the EEPROM reprogramming routine if the user has requested reprogramming of the EEPROM which forms the transmitter pulse generator 220. Next, in step S1280, the control system checks the status of the external button inputs. If any of the buttons have been pressed, control jumps to step S1050 as outlined above. Once the external buttons have been responded to, control jumps back from step S1050 to step S1100. In step S1280, if no button has been pressed, control jumps directly back to step S1100.

Figure 8:
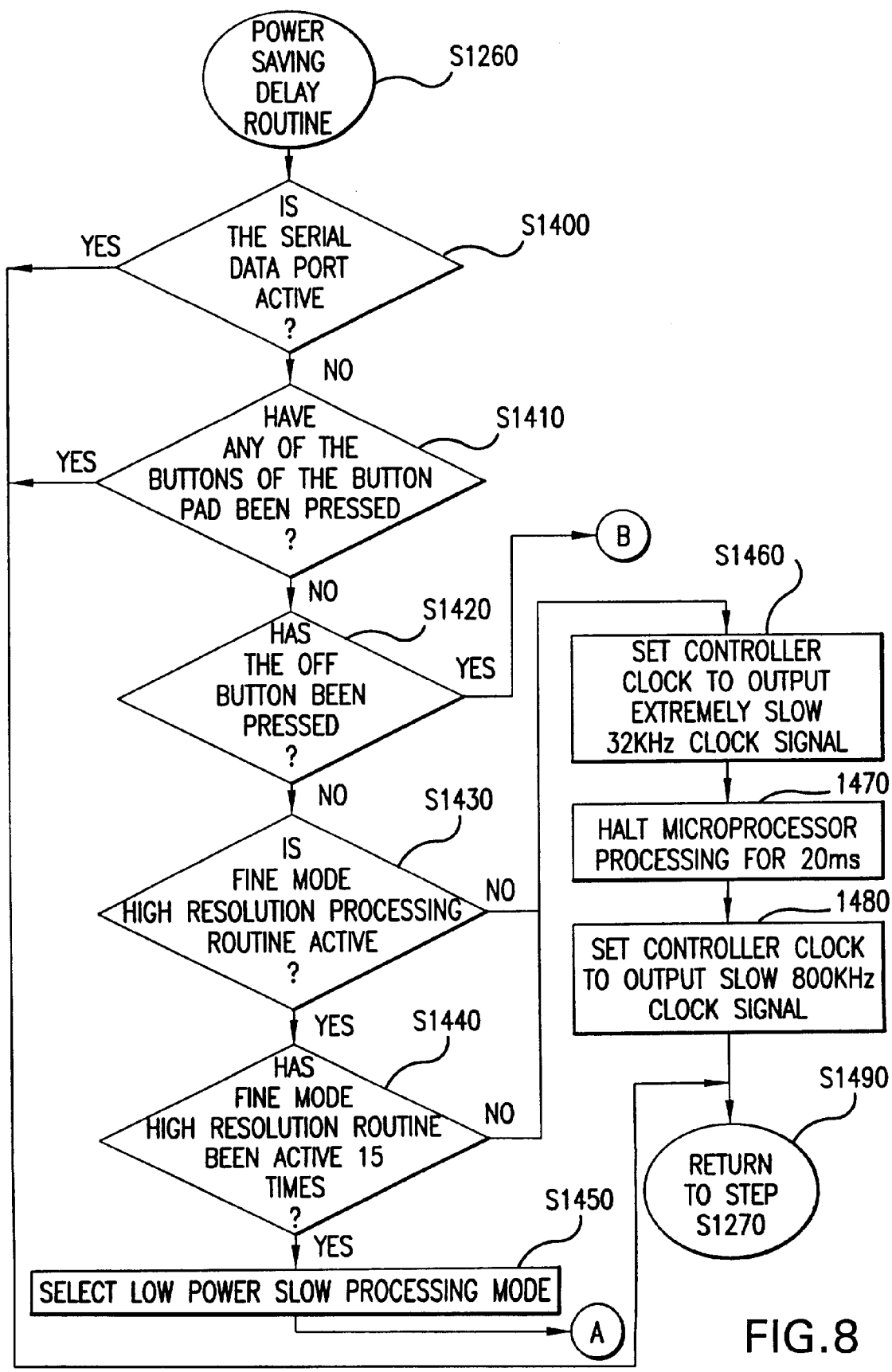
FIG. 8 shows the power mode delay routine of FIG. 7 in greater detail.

As indicated above, FIG. 8 shows the power mode checking routine of step S1260 in greater detail. As shown in FIG. 8, when the power mode checking routine of step S1260 is entered, control jumps to step S1400. In step S1400, the control system determines whether a serial data transmission through the serial data port is currently active. If so, control jumps to step S1490. Otherwise, control continues to step S1410. In step S1410, the control system determines if any external buttons of the button pad 180 have been pressed. If so, control then jumps to step S1490. If not, control continues to step S1420. In step S1420, the control system determines if the OFF button was pushed. If so, control jumps from step S1420 to step S1090. Otherwise, control continues to step S1430.

In step S1430, the control system determines if the fine mode high resolution processing step is active. If it is not, control jumps to step S1460. Otherwise, control continues to step S1440. In step S1440, the control system determines if the fine mode high resolution determining routine has been active for fifteen consecutive times preceding entry of the power mode checking routine of step S1260. If the fine mode high resolution determining routine has not been active for fifteen consecutive executions of the power mode checking routine of step S1260, control again jumps to step S1460. Otherwise, it is assumed that the position is changing very slowly or insignificantly, such that slow processing can be activated, and control continues to step S1450. In step S1450, the low-power slow processing mode is selected. Then, control jumps to step S1060.

In step S1460, the control clock 150 is set to output the 32 kHz extremely slow clock. Control then continues to step S1470. In step S1470, all processing by the microprocessor 110 is interrupted or halted for 20 milliseconds. Control then continues to step S1480. Once the 20 millisecond halt in step S1470 is finished, the controller clock 150 is set to output the 800 kHz slow clock signal. Control then continues to step S1490, which returns control to step S1260.

Figure 9A:
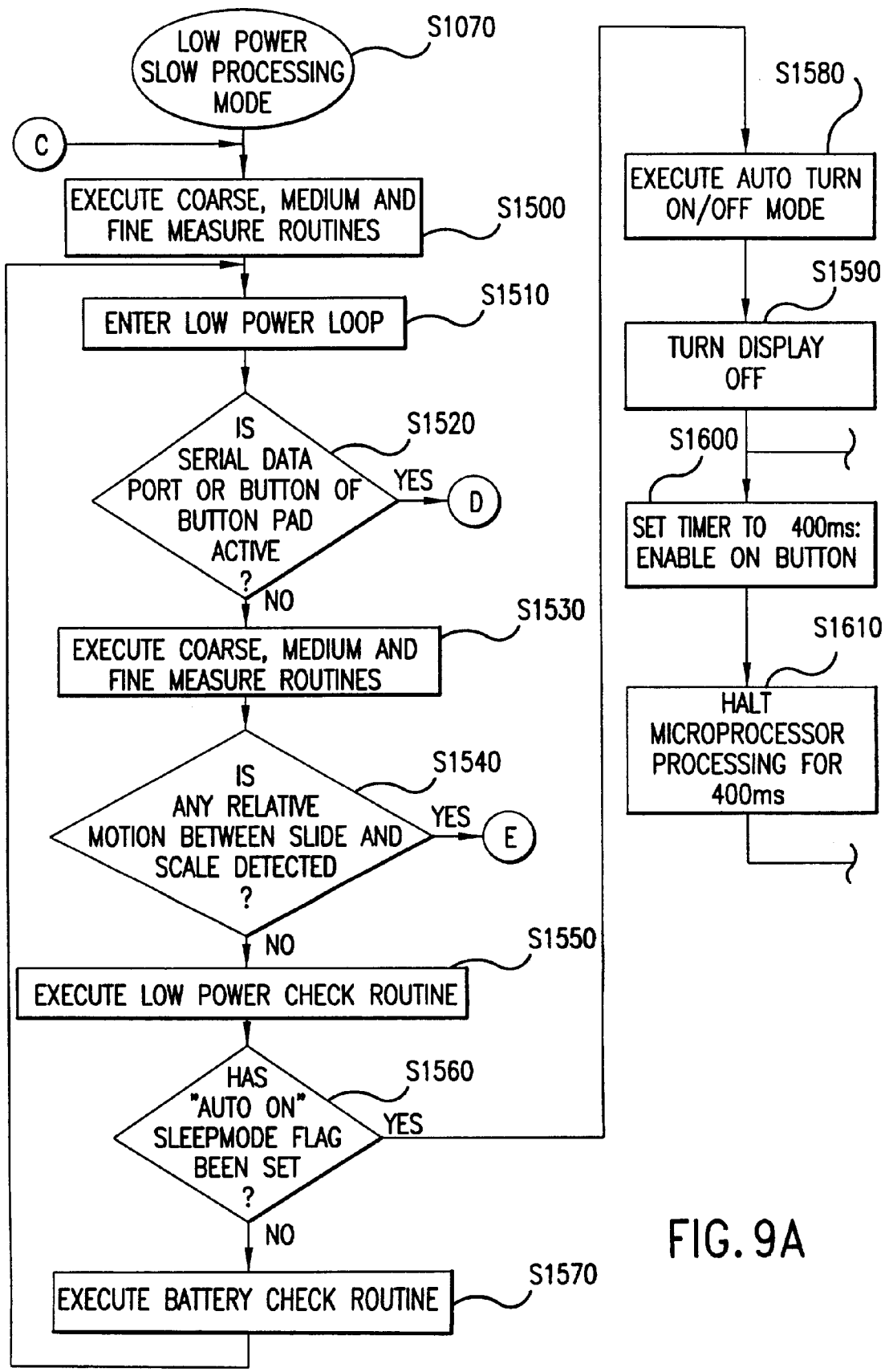
FIG. 9 shows the low-power slow processing mode in greater detail.
Figure 9B:
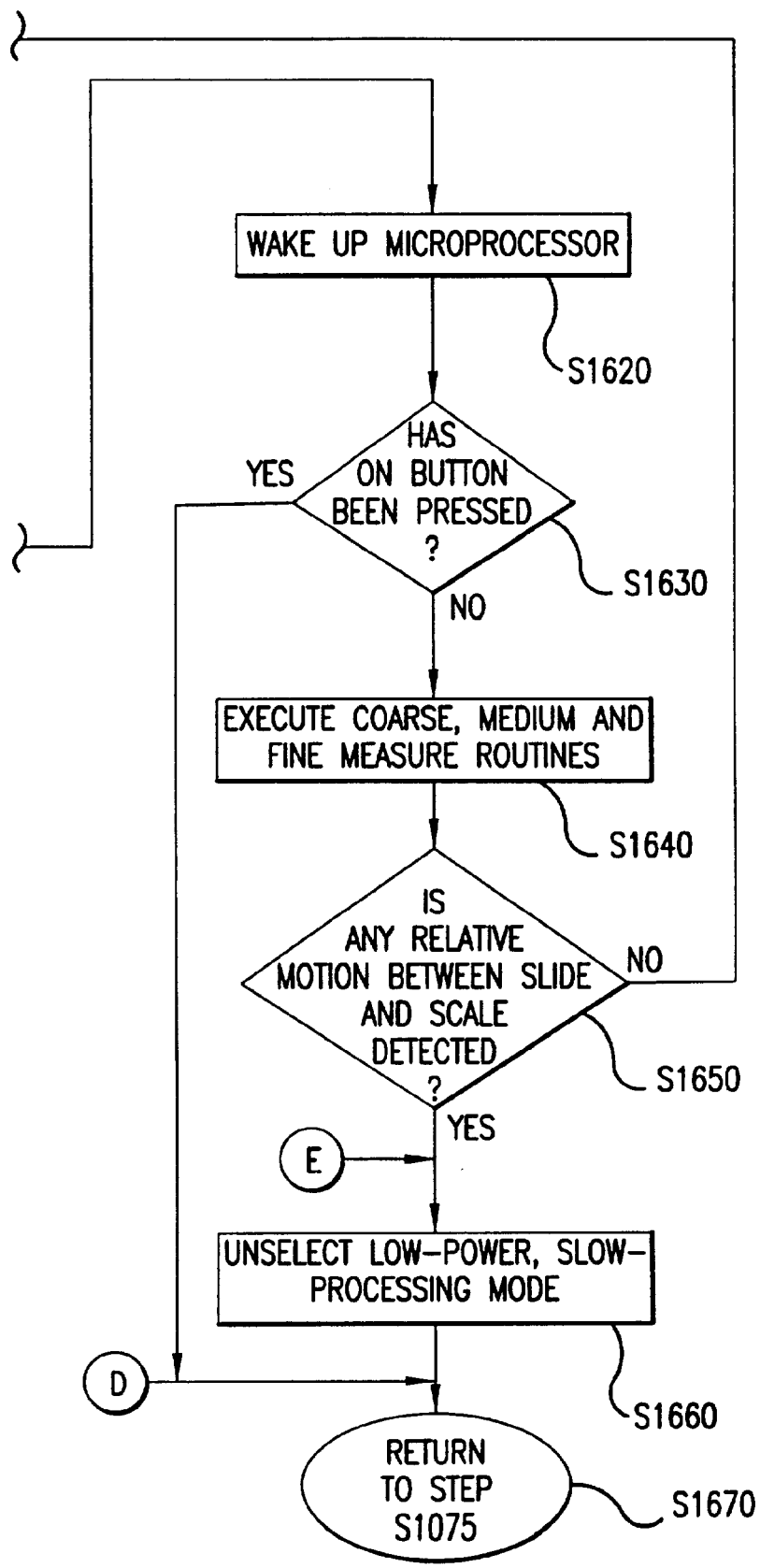

FIG. 9 shows the low-power slow processing mode routine of step S1070 in greater detail. Throughout the low-power slow processing mode shown in FIG. 9, the microprocessor 110 is in the extremely slow clock mode. This turns off the 800 kHz oscillator in the controller clock 150, and the 32 kHz oscillator in the controller clock 150 generates the clock signal. This results in reduced power consumption. Once control is fully passed, in step S1070, to the low-power slow processing mode, control continues to step S1500.

In step S1500, each of the three scales, the coarse scale, the medium scale and the fine scale, are measured. This measurement is considered to be a reference measurement. The three digital values output by the A/D converter 290 are stored for future comparison. However, no calculations are done on these values. That is, only the raw digital values are stored. Control then continues to step S1510.

In step S1510, a low power loop is entered. Control then continues to step S1520 within the low power loop. In step S1520, the control system determines if the serial data port is active or if any of the buttons have been pushed. If so, the low-power slow processing mode routine must be exited. Accordingly, control jumps to step S1670. Otherwise, control continues from step S1520 to step S1530. Step S1530 is identical to step S1500. Control then continues to step S1540.

In step S1540, the control system determines if any motion between the slide and the scale of the transducer 130 has been detected. This is preferably done by comparing the raw digital values from the A/D converter 290. Any change in any of these values is sufficient to indicate motion, so power is conserved by avoiding full position computations. Furthermore, comparing the corresponding bits of the raw digital values can be terminated to save power and computation as soon as the first difference is detected, since any difference indicates motion. If motion is detected, control jumps to step S1660. Otherwise, control continues to step S1550.

Figure 10:
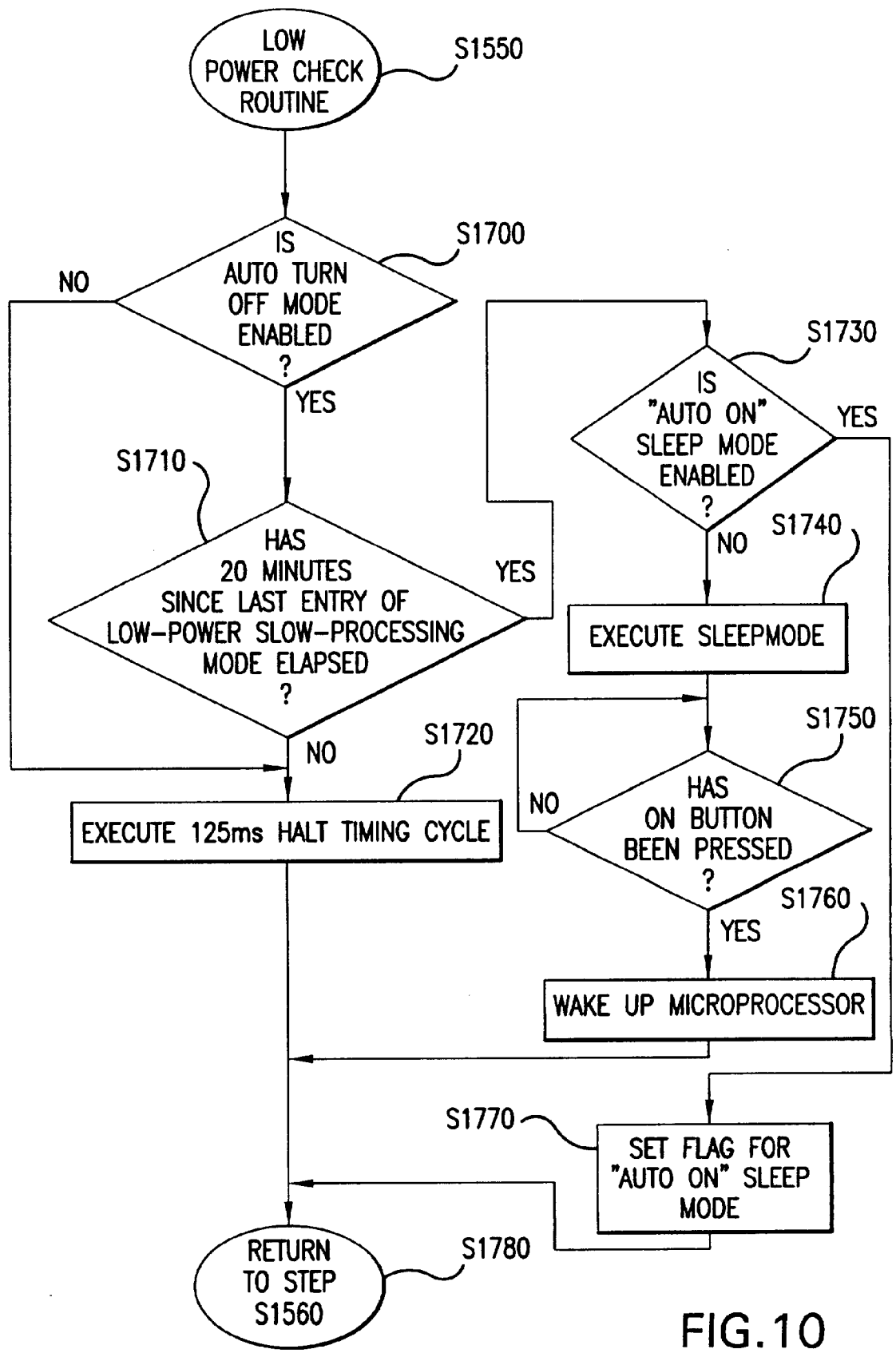
FIG. 10 shows the low power check routine of FIG. 9 in greater detail.

In step S1550, the low power check routine, as shown in greater detail in FIG. 10, is performed. Control then continues to step S1560. In step S1560, the control system determines if the "Auto On" sleep mode flag has been set. This means that the user has initialized the control system to enable the measuring system to power itself down under a certain condition, and that step S1550 has detected the condition and set a corresponding flag. If so, control jumps to step S1580. Otherwise, control continues to step S1570. In step S1570, the check battery level routine is performed. Control then returns to step S1510.

In step S1580, the "Auto On" sleep mode is entered. Control then continues to step S1590. In step S1590, the display 140 is turned off. Then, in step S1600, a timer is set for 400 ms and the ON button is also enabled. Next, in step S1610, the microprocessor halt, rather than being 20 ms, as in the high-power fast processing mode timing cycle shown in FIG. 11, or 85 ms, as in the low-power slow processing mode timing cycle shown in FIG. 12, is set to 400 ms. After the 400 ms halt has completed, control continues to step S1620. In step S1620, the microprocessor 110 is woken up. Control then continues to step S1630.

In step S1630, the control system determines if the ON button had been pressed. If so, control again jumps to step S1670. Otherwise, control continues to step S1640. In step S1640, the measurements described in step S1500 are again repeated. Control then continues to step S1650. Step S1650 is similar to step S1540, the control system determines if there has been any relative movement between the slide and the scale of the transducer 130. If so, control continues to step S1660. Otherwise, control jumps back to step S1600. In step S1660, the low power processing mode is unselected. Then, in step S1670, control returns to step S1075.

FIG. 10 shows the low power check routine S1550 in greater detail. As shown in FIG. 10, when the low power check routine is entered, control continues to step S1700. In step S1700, the control system determines if the Auto Turn OFF mode is enabled. If so, control continues to step S1710. Otherwise, control jumps to step S1720. In step S1710, the control system determines if a twenty minute period has elapsed since the control system last entered the low-power slow processing mode. If, in step S1710, the control system determines that at least a twenty minute period has elapsed, control jumps to step S1730. Otherwise, control continues to step S1720.

In step S1720, a 125 ms timing cycle is executed, as shown in FIG. 12. In this 125 ms timing cycle, a 40 ms slow processing portion is followed by an 85 ms slow halt portion. In the 40 ms slow processing portion, the steps of the low-power slow processing mode shown in FIG. 9 are executed. Then, during the 85 ms slow halt portion, no instructions are executed by the microprocessor 110. The control system then jumps to step S1780.

As mentioned above, if, in step S1710, the low-power slow processing mode has been active for a twenty minute period it implies that motion, if any, has been insignificant during all that time. Thus, control jumps to step S1730. In step S1730, the control system determines if the "Auto ON" sleep mode has been enabled. If so, control jumps to step S1770. Otherwise, no "Auto On" feature is implemented and control continues to step S1740. In step S1740, the sleep mode is started. Next, in step S1750, the control system determines if the ON button has been pushed. If not, control jumps back to step S1750. Otherwise, control continues to step S1760. In step S1760, the microprocessor 110 is woken up. Control then jumps to step S1780.

If the Auto ON sleep mode is enabled, control jumps directly to step S1770 from step S1730. In step S1730, the flag for the Auto Turn ON sleep mode is set. Control then continues to step S1780. In step S1780, control returns to step S1560.

Figure 11A:
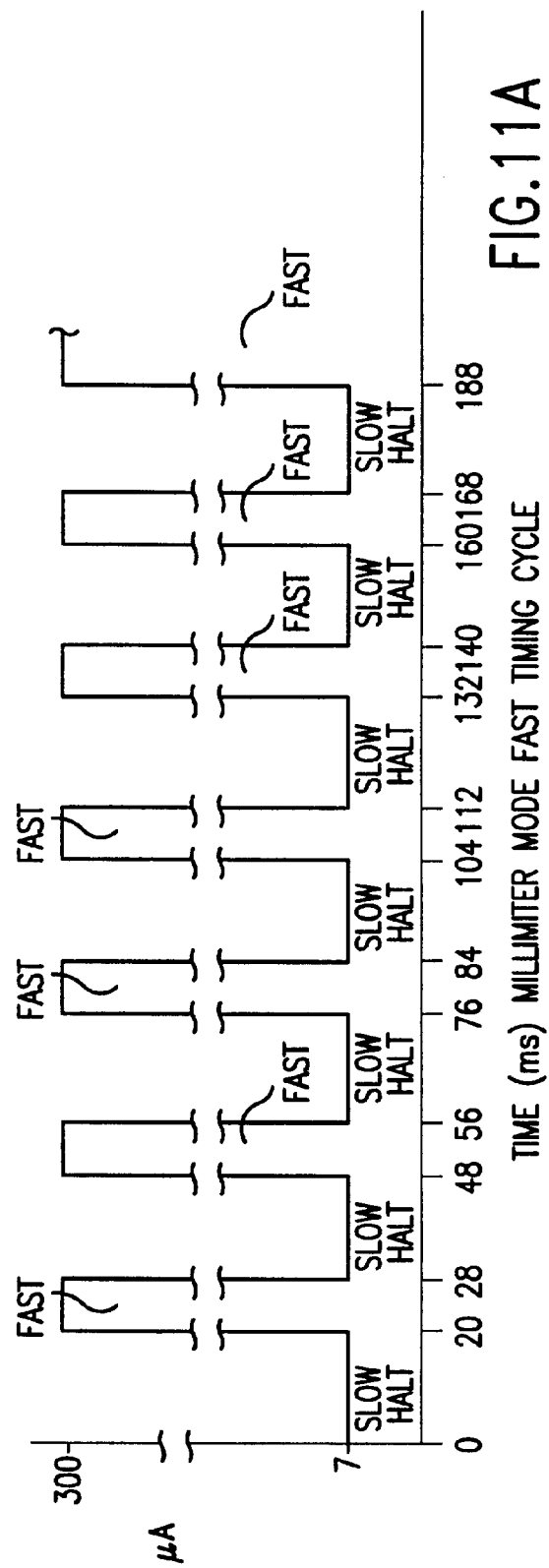
FIG. 11 shows the timing cycles for the high-power fast processing mode.
Figure 11B:
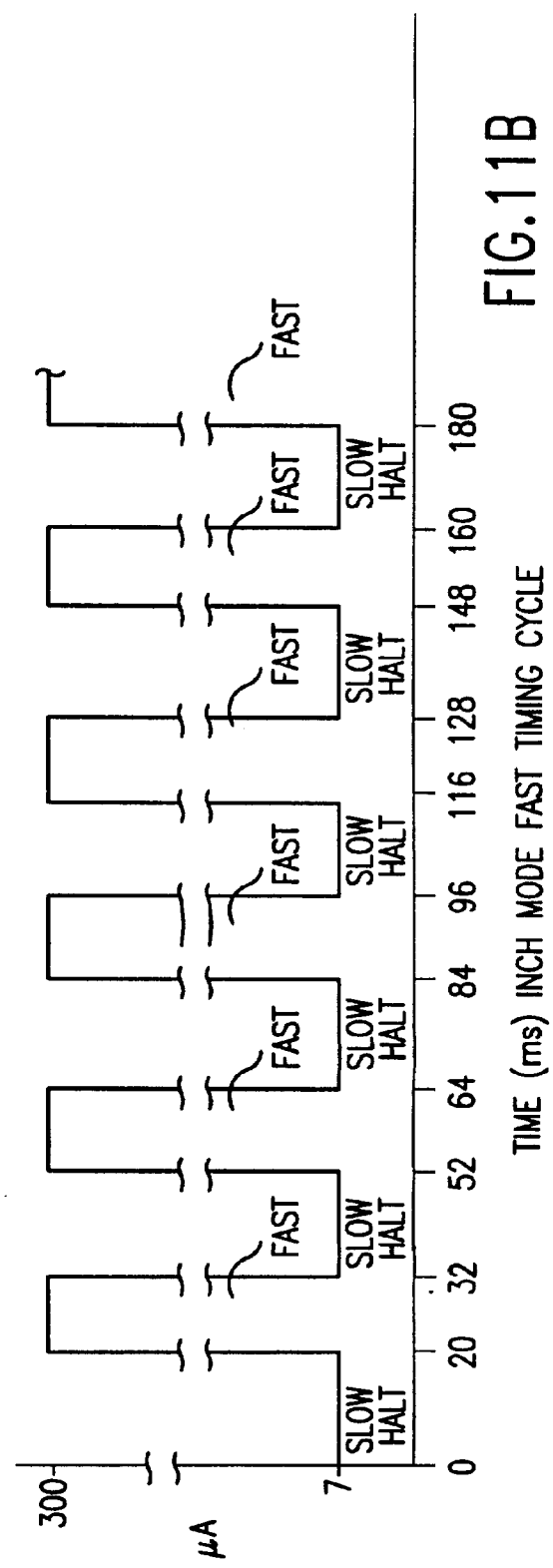
Figure 12:
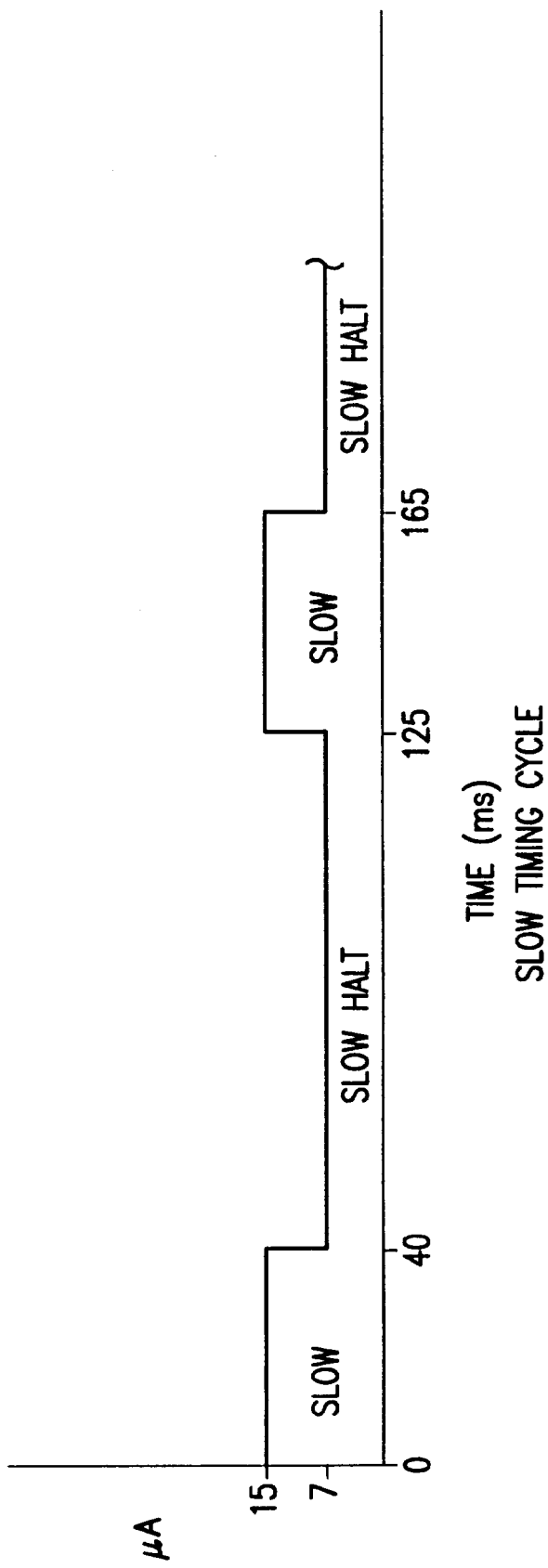
FIG. 12 shows timing cycles for the low-power slow processing mode.

FIG. 11 shows the timing cycles for the high-power fast processing mode. FIG. 12 shows the timing cycle for the low-power slow processing mode. As shown in FIG. 11, when the system is in the coarse, medium, or fine measurement modes, a 20 ms slow halt delay is inserted into the timing cycle. This means that the microprocessor 110 turns off the slow oscillator and turns on the extremely slow oscillator of the controller clock 150. Then, the microprocessor 110 halts for 20 ms. During the halt, the power consumption by the microprocessor 110 is only 7 $\mu$A.

The purpose of placing the microprocessor 110 into the low-power slow processing mode, then halting it, is to set a practical limit on the number of times per second that the high-power fast processing mode of step S1030 is executed, and to spend the excess time in as low a power mode as possible. As shown in FIG. 11, the high-power fast processing mode executes in about 8 ms when the electronic measurement system is in the millimeter measuring mode, and in about 12 ms when the electronic measurement system 100 is in the inch measurement mode.

This is a powerful power conserving function when the electronic measurement system is being used constantly to take measurements. As shown in FIG. 11, during the high-power fast processing, the microprocessor 110 consumes about 300 $\mu$A during each 8 ms (or 12 ms) fast processing portion of the high-power fast processing mode timing. Accordingly, 62% of each 32 ms loop (inch mode) or 71% of each 28ms (millimeter mode) cycle is spent in the slow halt portion of the timing cycle where only 7 $\mu$A are consumed.

Accordingly, during each 32 ms timing cycle for the inch mode, only $((20*7)+(300*12))/32 = 117$ $\mu$A average are consumed, rather than the 300 $\mu$A that would have been consumed had the microprocessor 110 remained solely in the high-power fast processing mode main processing routine. Similarly, during each 28 ms timing cycle for the millimeter mode, the microprocessor 110 consumes only $((20*7)+(300*8))/28 = 91$ $\mu$A average, rather than the 300 $\mu$A the microprocessor 110 would have consumed had the microprocessor remained in the high-power fast processing mode.

Thus, when the current consumption during the fast portion of the timing cycle, as shown in FIG. 11, is 300 $\mu$A, and the current consumption during the slow halt portion of the timing cycle is 7 $\mu$A, the addition of the slow halt delay portion reduces the average current consumption to about 117 $\mu$A when the electronic measurement system is in the millimeter mode, and to about 91 $\mu$A when the electronic measurement system 100 is in the inch mode.

FIG. 12 shows the timing cycle for the low-power slow processing mode. As shown in FIG. 12, during the 40 ms slow portion of the 125 ms timing cycle, the steps of the low-power slow processing mode of step S1070, as shown in FIG. 9, are executed. During the low-power slow processing mode, only the 32 kHz oscillator of the controller clock 150 is active. Accordingly, the power consumption during the 40 ms slow portion is approximately 15 $\mu$A.

Then, a halt, as described above, is activated during the 85 ms slow halt portion of the timing cycle for the low-power slow processing mode S1070. During this slow halt portion, no instructions are executed, and the current again drops to 7 $\mu$A. Accordingly, the average current consumption in the low-power slow processing mode is approximately 10 $\mu$A. When the electronic measurement system of this invention is used only intermittently, to make only occasional measurements (for example, one or two measurements per minute), the low-power slow processing mode provides a significant amount of power conservation when using the electronic measurement system of this invention. Since the high-power fast processing mode is used relatively infrequently, the approximately 100 µA consumed during the high-power fast processing mode of step S1030 can largely be ignored. Thus, the approximate battery life for the electronic measurement system of this invention can be determined based on the 10 µA operating current consumed during the low-power slow processing mode.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention, as set forth in the following claims.

What is claimed is:

1. A method for conserving power in an electronic measurement system, the electronic measurement system comprising a controller, a signal generating and processing circuit, and an electronic position transducer, the method comprising:

operating the controller at a first clock frequency;

controllably enabling a transducer sampling sequence of the signal generating and processing circuit, the signal generating and processing circuit producing at least one output derived from the electronic position transducer; and operating the signal generating and processing circuit at a second clock frequency higher than the first clock frequency only when the transducer sampling sequence is enabled during a sampling mode, the sampling mode comprising a maximum-power, fast processing mode;

wherein operating the controller at the first clock frequency comprises:

operating a controller clock of the electronic measurement system to output a clock signal at the first clock frequency;

determining if a first member of the electronic position transducer is moving relative to a second member of the electronic position transducer;

operating the controller in a low-power, slow processing mode when the first member is not moving relative to the second member; and operating the controller in the sampling mode if the first member is moving relative to the second member, comprising:

operating the controller at the first clock frequency during a first portion of a repetitive timing cycle, and operating the controller at a third clock frequency during a second portion of the repetitive timing cycle, wherein the third clock frequency is lower than the first clock frequency.

2. The method of claim 1, wherein the at least one output is used to detect a position change of a first member of the electronic position transducer relative to a second member of the electronic position transducer.

3. The method of claim 1, wherein the at least one output is used to calculate the position of a first member of the electronic position transducer relative to a second member of the electronic position transducer.

4. The method of claim 1, wherein the electronic position transducer is an absolute position transducer.

5. The method of claim 1, wherein the electronic position transducer is a capacitive transducer.

6. The method of claim 1, wherein the electronic position transducer is an inductive transducer.

7. The method of claim 1, wherein the first clock frequency is at most equal to 2 MHz.

8. The method of claim 7, wherein the first clock frequency is at most equal to 100 kHz.

9. The method of claim 8, wherein the second clock frequency is greater than 1 MHz.

10. The method of claim 1, wherein the second clock frequency is selected so that one clock cycle of the second clock frequency is longer than a rise time of the signals through the electronic position transducer.

11. The method of claim 1, wherein the first portion of the repetitive timing cycle is shorter than the second portion of the repetitive timing cycle.

12. The method of claim 1, wherein the step of operating the controller at the first clock frequency during the first portion of the repetitive timing cycle comprises:

enabling the signal generating and processing circuit;

generating at least one position measurement signal using the electronic position transducer;

inputting the at least one position measurement signal from the signal generating and processing circuit; and processing the at least one position measurement to determine the position of the first member of the electronic position transducer relative to the second member of the electronic position transducer.

13. The method of claim 12, wherein the step of generating at least one position measurement signal using the electronic position transducer comprises:

outputting at least one input signal from the signal generating and processing circuit to the electronic position transducer;

inputting at least one output signal from the electronic position transducer to the signal generating and processing circuit; and processing the at least one output signal to generate the at least one position measurement signal.

14. The method of claim 13, further comprising repeating the outputting, inputting and generating steps for each one of at least one set of second electrodes on one of the first and second members of the electronic position transducer.

15. The method of claim 12, wherein the step of operating the controller at the third clock frequency during the second portion of the repetitive timing cycle comprises:

operating the controller clock of the electronic measurement system to output the clock signal at the third clock frequency;

setting a timer of the controller to a predetermined time interval;

halting processing operations of the controller;

determining if the predetermined time interval has elapsed;

when the predetermined time interval has elapsed, operating the controller clock to output the clock signal at the first clock frequency; and restarting the processing operations of the controller.

16. The method of claim 11, wherein the step of operating the controller in the low-power, slow processing mode comprises:

operating the controller at a third clock frequency during a first portion of a second repetitive timing cycle, wherein the third clock frequency is lower that the first clock frequency; and halting operation of the controller during a second portion of the second repetitive timing cycle.

17. The method of claim 16, wherein the first portion of the second repetitive timing cycle is shorter than the second portion of the second repetitive timing cycle.

18. A method for conserving power in an electronic measurement system, the electronic measurement system comprising a controller, a signal generating and processing circuit, and an electronic position transducer, the method comprising:

operating the controller at a first clock frequency;

controllably enabling a transducer sampling sequence of the signal generating and processing circuit, the signal generating and processing circuit producing at least one output derived from the electronic position transducer; and operating the signal generating and processing circuit at a second clock frequency higher than the first clock frequency only when the transducer sampling sequence is enabled during a sampling mode, the sampling mode comprising a maximum-power, fast processing mode;

wherein operating the controller at the first clock frequency comprises:

operating a controller clock of the electronic measurement system to output a clock signal at the first clock frequency;

determining if a first member of the electronic position transducer is moving relative to a second member of the electronic position transducer;

operating the controller in the sampling mode if the first member is moving relative to the second member, and operating the controller in a low-power, slow processing mode if the first member is not moving relative to the second member, comprising:

operating the controller at a third clock frequency during a first portion of a second repetitive timing cycle, wherein the third clock frequency is lower that the first clock frequency; and halting operation of the controller during a second portion of the second repetitive timing cycle.

19. The method of claim 18, wherein the step of operating the controller at the first clock frequency during the first portion of the first timing cycle comprises:

operating a controller clock of the electronic measurement system to output a clock signal at the first clock frequency;

controllably enabling the signal generating and processing circuit such that the signal generating and processing circuit is enabled only when taking a measurement; and operating the signal generating and processing circuit at a third clock frequency higher than the first clock frequency only when the signal generating and processing circuit is enabled.

20. The method of claim 18, wherein the first portion of the first repetitive timing cycle is shorter than the second portion of the first repetitive timing cycle, and the first portion of the second repetitive timing cycle is shorter than the second portion of the second repetitive timing cycle.

21. The method of claim 18, wherein the step of taking measurements during the first portion of the first repetitive timing cycle comprises:

enabling the signal generating and processing circuit;

generating at least one position measurement signal using the electronic position transducer;

inputting the at least one position measurement signal from the signal generating and processing circuit; and processing the at least one position measurement to determine the position of the first member of the electronic position transducer relative to the second member of the electronic position transducer.

22. The method of claim 21, wherein the step of generating at least one position measurement signal using the electronic position transducer comprises:

outputting at least one input signal from the signal generating and processing circuit to the electronic position transducer;

inputting at least one output signal from the electronic position transducer to the signal generating and processing circuit; and processing the at least one output signal to generate the at least one position measurement signal.

23. The method of claim 22, further comprising repeating the outputting, inputting and generating steps for each one of at least one second set of scale electrodes on one of the first and second members of the electronic position transducer.

24. The method of claim 20, wherein the step of operating the controller at the second clock frequency during the second portion of the first repetitive timing cycle comprises:

operating a controller clock of the electronic measurement system to output a clock signal at the second clock frequency;

setting a timer of the controller to a predetermined time interval;

halting processing operations of the controller;

determining if the predetermined time interval has elapsed;

when the predetermined time interval has elapsed, operating the controller clock to output the clock signal at the first clock frequency; and restarting the processing operations of the controller.

\* \* \* \* \*